United States Patent
Blas Martinez et al.

(10) Patent No.: US 11,174,821 B2
(45) Date of Patent: Nov. 16, 2021

(54) CONICAL GUARD FOR AIR CONDUIT

(71) Applicant: Ford Global Technologies, LLC, Dearborn, MI (US)

(72) Inventors: Luis Felipe Blas Martinez, Jilotepec (MX); Miguel Angel Leon Guerrero, Villas de Aragon / Ecatepec de Morelos (MX); Enrique Lopez Hernandez, Toluca (MX); Dhaval Vaishnav, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 16/156,985

(22) Filed: Oct. 10, 2018

(65) Prior Publication Data

US 2020/0116110 A1 Apr. 16, 2020

(51) Int. Cl.
*F02M 25/08* (2006.01)
*B01D 53/04* (2006.01)

(52) U.S. Cl.
CPC ..... *F02M 25/0872* (2013.01); *B01D 53/0446* (2013.01); *F02M 25/089* (2013.01); *B01D 2257/708* (2013.01); *B01D 2259/4516* (2013.01)

(58) Field of Classification Search
CPC .......... F02M 25/0836; F02M 25/089; F02M 25/0854; F02M 25/0872; F02M 25/08; F02D 41/004; F02D 41/0032; F02D 41/003; F02D 41/0045; F02D 41/0042
USPC ........................................ 123/519, 520, 521
See application file for complete search history.

(56) References Cited

U.S. PATENT DOCUMENTS

| | | | |
|---|---|---|---|
| 5,125,940 A | 6/1992 | Stanhope et al. | |
| 6,379,429 B1 | 4/2002 | Scranton, Jr. | |
| 6,599,350 B1 | 7/2003 | Rockwell et al. | |
| 2003/0042452 A1* | 3/2003 | Burke | F02M 25/0836 251/129.15 |
| 2012/0137884 A1 | 6/2012 | Steinman | |
| 2015/0240756 A1* | 8/2015 | Dudar | F02M 25/0854 123/519 |
| 2015/0354480 A1* | 12/2015 | Dudar | B60W 20/50 701/22 |
| 2015/0361928 A1 | 12/2015 | Fujiwara et al. | |
| 2016/0053726 A1* | 2/2016 | Dudar | F02M 25/0836 123/520 |
| 2019/0285018 A1* | 9/2019 | Dudar | F02M 35/1038 |

FOREIGN PATENT DOCUMENTS

| | | |
|---|---|---|
| JP | H07324654 A | 12/1995 |
| JP | 3343572 B2 | 11/2002 |
| JP | 4717844 B2 | 4/2011 |
| JP | 6001521 B2 | 9/2016 |

* cited by examiner

*Primary Examiner* — Sizo B Vilakazi
(74) *Attorney, Agent, or Firm* — Geoffrey Brumbaugh; McCoy Russell LLP

(57) ABSTRACT

Methods and systems are provided for a conical guard for an evaporative emissions control (EVAP) system. In one example, the conical guard is arranged at an end of a vent line of the EVAP system, adapted with openings sufficiently small to hinder entry of foreign bodies into the vent line. The conical guard is further configured to trap and expel debris and maintain a desired rate of flow through the EVAP system.

10 Claims, 11 Drawing Sheets

CONICAL GUARD FOR AIR CONDUIT

FIELD

The present description relates generally to a vehicle fueling system.

BACKGROUND/SUMMARY

In fuel-powered vehicles, a fueling system allows replenishing of a fuel reservoir and continued operation of the vehicle. The fueling system, comprising a network of components such as a fuel tank, valves, as well as liquid and gas flow passages, may be adapted with an evaporative emissions control (EVAP) system to reduce emission of fuel vapors to the surrounding atmosphere by recovering fuel vapors via a carbon canister before release to the atmosphere. The carbon canister is configured to adsorb gas-phase fuel molecules resulting in flow of filtered fresh air from the carbon canister through an air vent line. The vent line acts as a conduit between the carbon canister and the surrounding atmosphere and moderates a pressure of the fuel tank so that refueling may be achieved without generation of backpressure in the fuel tank.

An arrangement of the vent line as a passageway between the EVAP system and external surroundings of the vehicle may result in a positioning of an open end of the vent line at a periphery of the vehicle, for example, at a bottom or rear end of the vehicle, and exposing the open end of the vent line to external, outdoor elements. In particular, the open end of the vent line may be susceptible to air-borne debris and accessible to small, mobile organisms, such as spiders. For example, yellow sac spiders may enter the vent line and spin a web or cocoon within the vent line, creating an obstruction in the vent line that hinders air flow. The blockage caused by the spider web or cocoon may reduce flow through the vent line enough that pressure, unable to be released, accumulates in the fuel tank during refueling, leading to degradation of the fuel tank as well as premature shut-off during refueling.

In addition to obstructions formed by mobile organisms, debris, such as dust, may be ingested into the EVAP system during purging of the carbon canister. When the carbon canister is purged to strip adsorbed fuel from an adsorbent of the carbon canister, the canister is exposed to vacuum from an intake manifold of an engine to which the EVAP system is coupled. A pressure gradient between the EVAP system and the intake manifold may aspirate fresh air into the vent line into the engine, drawing in debris within a vicinity of an opening of the vent line and, over time, may lead to sufficient accumulation in the vent line to restrict flow. A decrease in flow during purging operation may result in insufficient purging of the carbon canister and higher than allowed bleed emissions. A decrease in flow through the vent line during refueling may similarly result in premature shut-off.

Premature shut-off of a refueling nozzle may occur when a pressure in the fuel tank is detected to reach a threshold pressure. Strict regulations regarding nozzle shut-off have been implemented in order to reduce overfilling of fuel tanks, where overfilling increases a likelihood of spillage. Premature shut-off, for example, arising from backpressure in a poorly vented fuel tank may cause operators to override an automatic shut-off system. Manual detection of the fuel detection reaching a maximum fill level may be difficult, leading to a high likelihood of overfilling the tank.

Attempts to address the infiltration of mobile organisms and/or debris into a fueling system vent line to circumvent blockage of the vent line include adapting the vent line with a physical barrier to entry of foreign matter. One example approach is shown in Japanese Application No. 6001521. Therein, the vent line includes a first set of ventilation slits disposed in a wall of the vent line at an open end of the vent line that is opposite of an end that is connected to a fuel canister. The vent line further includes a cover member configured with a second set of ventilation slits disposed in surfaces of the cover member that are aligned parallel with a direction of flow, adapted to fit over the open end and enclose the first set of ventilation slits. The second set of ventilation slits may be oriented perpendicular relative to the first set of ventilation slits and a surface of the cover member that is perpendicular to the direction of flow through the vent line may be adapted with a plurality of apertures. When the cover member is fitted over the end of the vent line, covering the first set of ventilation slits, the combination of the first and second sets of ventilation slits forms a labyrinthine structure, blocking entry of debris and foreign objects from entering the vent line. The plurality of apertures, with diameters sufficiently small to block entry of spiders and other mobile organisms, allows air to be vented out of the vent line.

However, the inventors herein have recognized potential issues with such systems. As one example, the small diameters of the plurality of apertures, as well as the labyrinthine structure formed by the first and second sets of ventilation slits, may impose a restriction on flow through the vent line. The flow restriction may be similar to the restriction caused by debris aggregation and spider nests/webs. Hence, the restriction on flow through the apertures may negate any benefit of preventing entry of mobile organisms and/or debris. The flow restriction may result in a drop in pressure across the end of the vent line and allow pressure within the fuel tank to increase, leading to high pressure in the fuel tank during vehicle operation as well as structural degradation of the tank. In addition, the plurality of apertures may be small enough to block mobile organisms and restrict air flow but may not inhibit ingestion of debris with smaller dimensions than mobile organisms into the vent line.

In one example, the issues described above may be addressed by a guard for an air conduit, including an outer housing, a first portion of the outer housing having a conical shape and a second portion of the outer housing having a uniform diameter along a length of the guard, the length parallel with a direction of flow through the guard, and a screen disposed in the first portion of the outer housing, perpendicular to the length of the guard. In this way, air flow through the conduit is not restricted while the screen blocks foreign matter from entering the conduit.

As one example, the conical guard may have a shape that allows the conical guard to act as a diffuser during refueling and a nozzle during purging of a fuel vapor canister when included in a vehicle EVAP system. The conical guard may be adapted with a screen at one end that blocks entry of mobile organism such as spiders into the vent line. The screen may also be configured to inhibit aspiration of debris into the vent line by inducing air flow into the conical guard to swirl, generating a vortex that separates the debris from the swirling air based on centrifugal force. The shape of the conical guard may maintain a consistent pressure gradient across the screen during refueling and purging. A change in pressure across the conical guard during venting of air from the fuel tank, via the fuel vapor canister, is reduced and a flow rate of air into the fuel vapor canister through the vent line during purging events is increased in comparison to a conventional guard with a diameter that remains uniform along a length of the guard. By maintaining consistent flow through the vent line while providing a barrier to entry of objects and organisms into the vent line, refueling efficiency is increased and a probability of premature shut-off, resulting from triggering of a shut-off mechanism of a gas station refueling nozzle when a threshold pressure is detected, is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A-14 are shown approximately to scale

DETAILED DESCRIPTION

Figure 1:
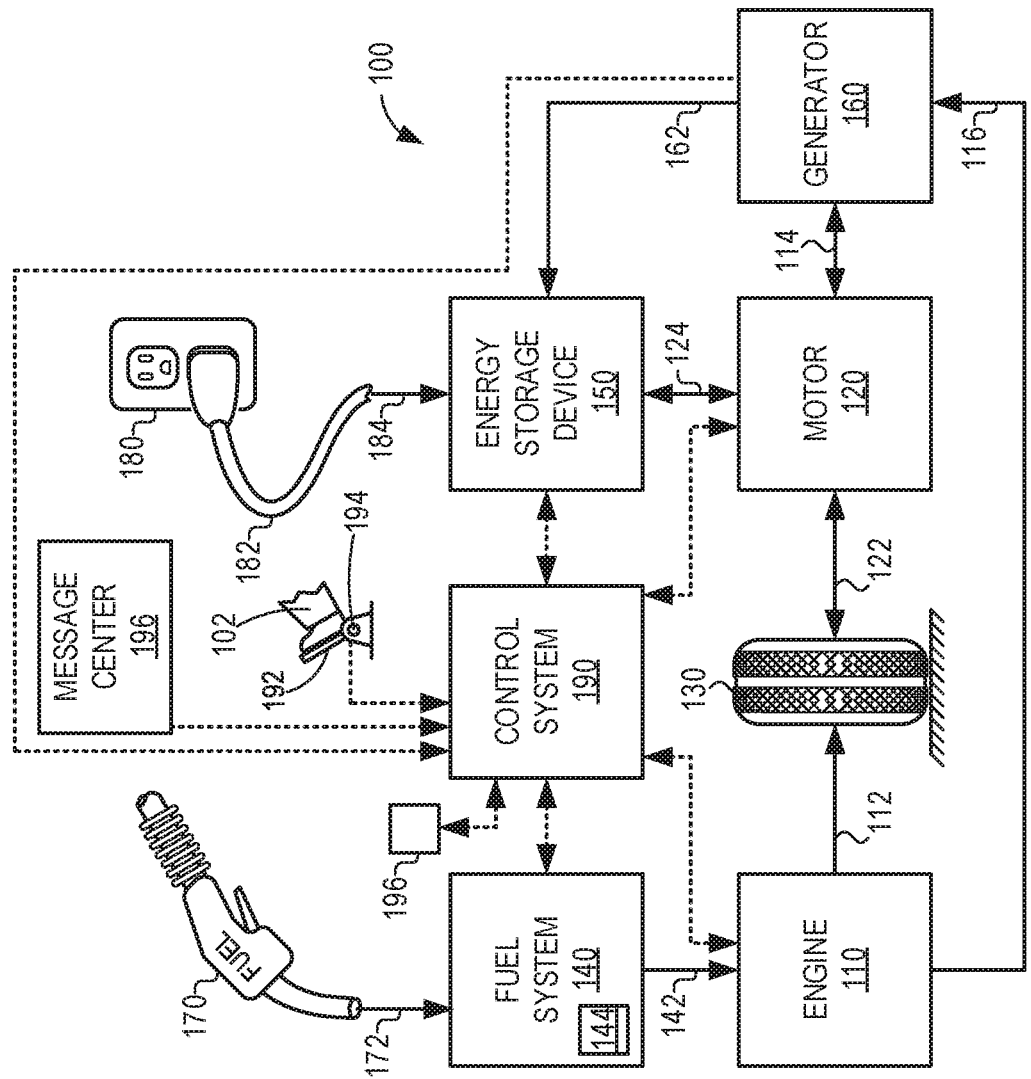
FIG. 1 shows a schematic diagram of a vehicle propulsion system in which an evaporative emissions control (EVAP) system may be implemented.
Figure 8:
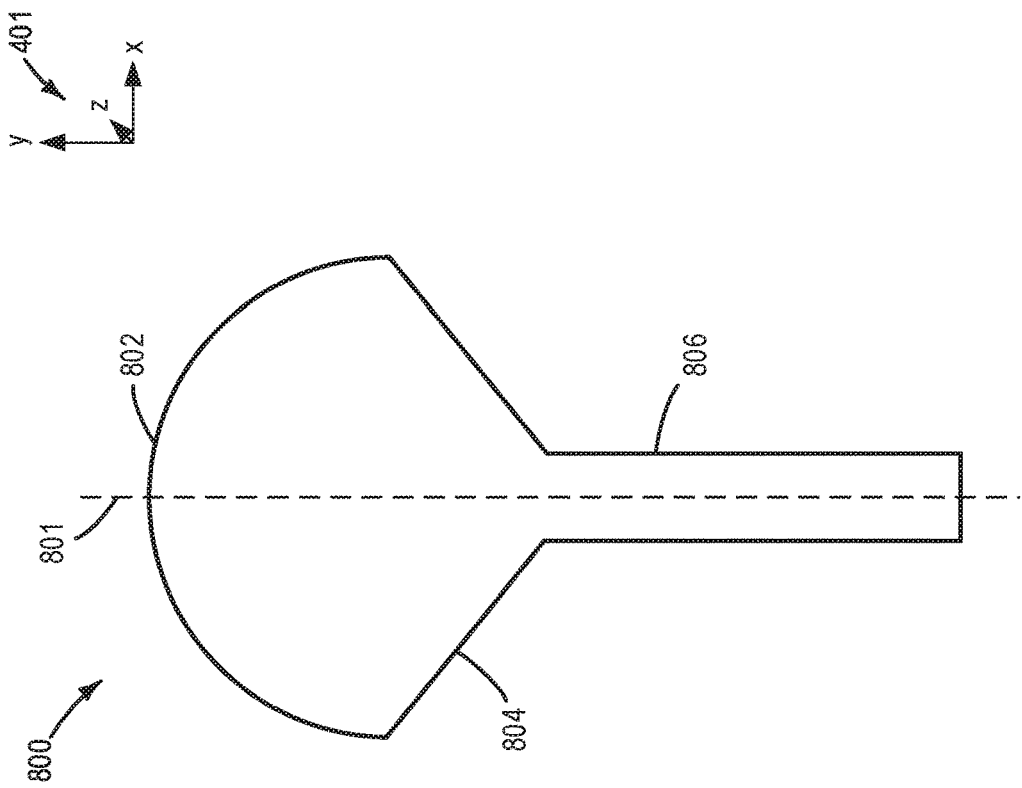
FIG. 8 shows a second alternate embodiment of the conical guard showing a variation in a shape of the screen.
Figure 14:
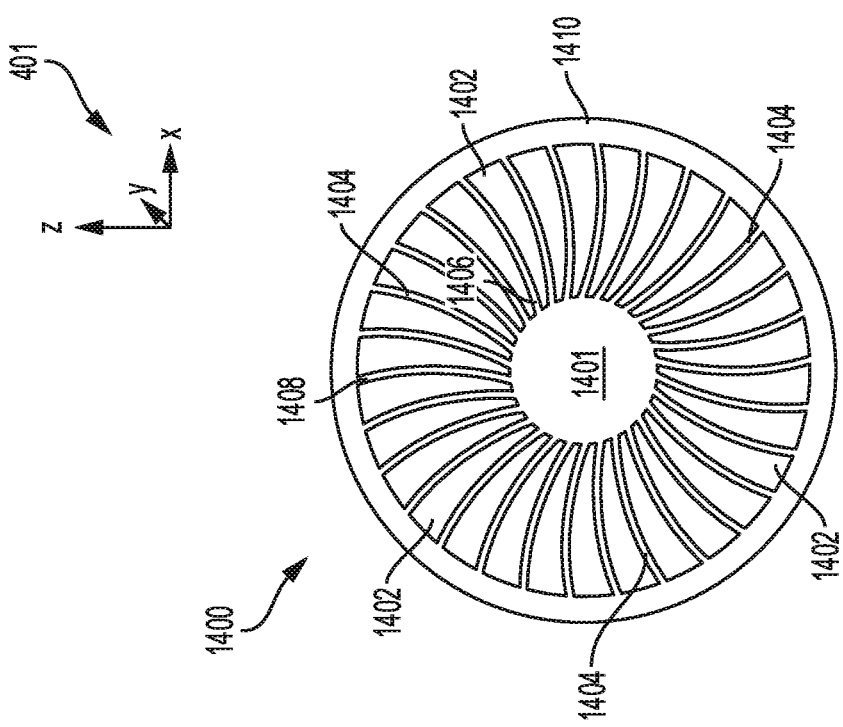
FIG. 14 shows a third alternate embodiment of a screen of the conical guard.
Figure 15:
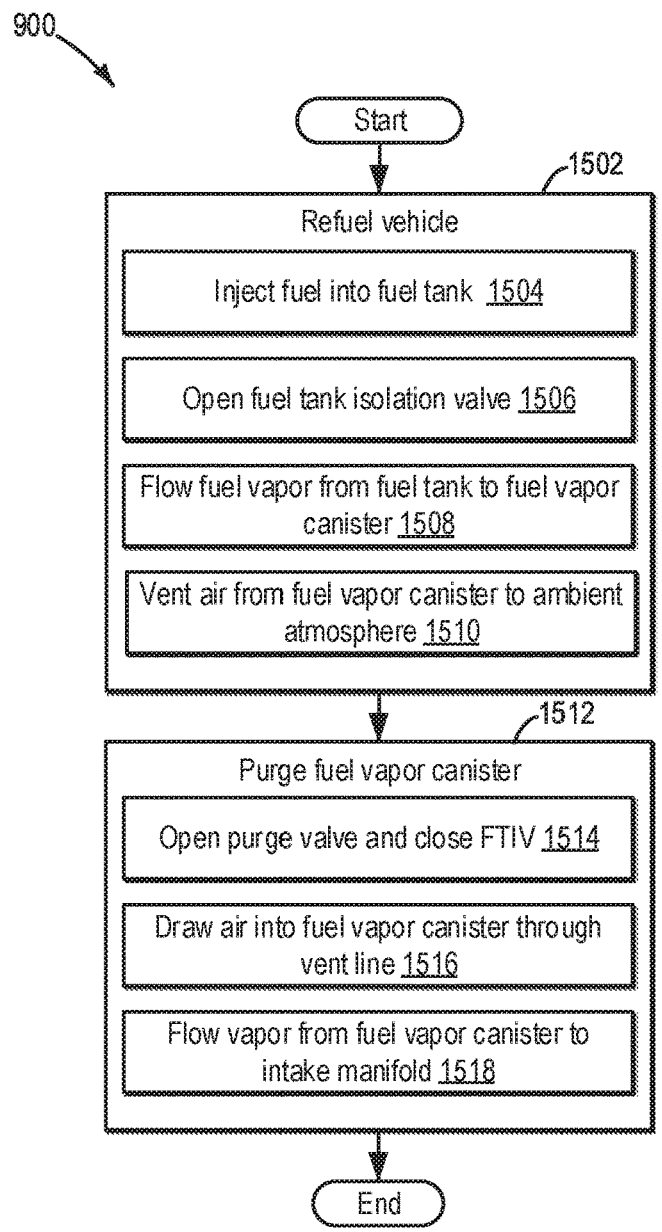
FIG. 15 shows an example of a method for the EVAP system, adapted with the conical guard, during refueling and fuel vapor canister purging events.

The following description relates to systems and methods for a guard of an evaporative emissions control (EVAP) system. A vehicle propulsion system may include the EVAP system to reduce release of fuel vapors to the atmosphere. An example of a vehicle propulsion system in which the EVAP system may be implemented is shown in FIG. 1 in a schematic diagram. The EVAP system may further include a conical guard, shaped to increase air flow through a vent line of the EVAP system when air when air is drawn into the vent line and to decrease a pressure differential between the conical guard and ambient atmosphere. An example of an engine system adapted with the EVAP system and conical guard is depicted in another schematic diagram in FIG. 2. The EVAP system may include various components arranged in various locations within the vehicle. A positioning of elements of the EVAP system is shown in an example of the vehicle illustrated in FIG. 3A. For further clarity, an expanded insert showing a configuration of a fuel vapor canister and associated gas passages is depicted in FIG. 3B. The gas passages shown in FIGS. 3A-3B may include the vent line for flowing fresh air between the fuel vapor canister and the surrounding atmosphere. The vent line may be adapted with the conical guard, shown from a profile view in FIG. 4, to inhibit entry of objects, including spiders or other mobile organisms, into the vent line and to minimize flow restriction through the vent line that may result from arranging a screened device, e.g., the conical guard, at an end of the vent line. A geometry of a screen of the conical guard is shown in a top-down view in FIG. 5 and from a perspective view in FIG. 6. Variations in a geometry of the screen of the conical guard have been contemplated and one example of an alternative configuration of screen openings is depicted in FIG. 7 by radial flow passages instead of the peripheral flow passages formed in the screen of the conical guard shown in FIGS. 4-6. Further variations in a shape of the conical guard screen may lend additional attributes to the conical guard. For example, as shown in FIG. 8, configuring the conical guard with a domed screen may maintain flow through the vent line even if partial blockage of the screen occurs. In addition to impeding entry of mobile organisms, the conical guard may be configured to trap debris such as dust that may otherwise accumulate in the vent line of the EVAP system and restrict air flow. An example of an embodiment of a screen adapted to aid in trapping debris as well as blocking mobile organisms is shown from a top-down view in FIG. 9. Details of the screen, including angled vanes, or louvers, of the screen are depicted in a perspective view of the conical guard in FIG. 10 and in greater detail in an expanded perspective view of the screen in FIG. 11A. A geometry of one of the angled louvers of the screen is shown in greater detail in FIG. 11B in a cross-section taken across an opening of the screen. The angled louvers may induce cyclonic air flow within the conical guard, thereby removing debris from a central, linear path of air flow through the conical guard and into the vent line. The conical guard may also include a baffle positioned in an interior of the conical guard to retain debris when the debris is separated from the central flow path, as shown in a cross-section of the conical guard in FIG. 12. Another example of the conical guard may be further adapted with at least one particle outlet port when flows through the conical guard are high, illustrated in a perspective view of the conical guard in FIG. 13, that is disposed in an outer surface of the conical guard. As debris is directed away from the central flow path of the conical guard due to centrifugal force, the debris may be released to the atmosphere from the conical guard via one or more particle outlet ports as shown in FIG. 14 in a third embodiment of the screen of the conical guard. The screen may have curved openings that enhance a swirling effect on air flow and may be suitable for environments with high levels of airborne debris. A method describing events occurring in the EVAP during a refueling event and a purging event is shown in FIG. 15.

FIGS. 1-14 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to the figures, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline, ethanol, or a gasoline-ethanol blend) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. The vehicle propulsion system may also be configured to transition between two or more of the operating modes described above depending on operating conditions.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160, as indicated by arrow 116.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. Energy storage device 150 may be connected to a power source 180 via an electrical transmission cable 182 and receive electrical energy from power source 180, as indicated by arrow 184. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp indicated at 196. Furthermore, the fuel system 140 may include one or more sensors for detecting a fuel composition when more than one fuel type is used for combustion, as well as for measuring a fuel pressure.

Figure 2:
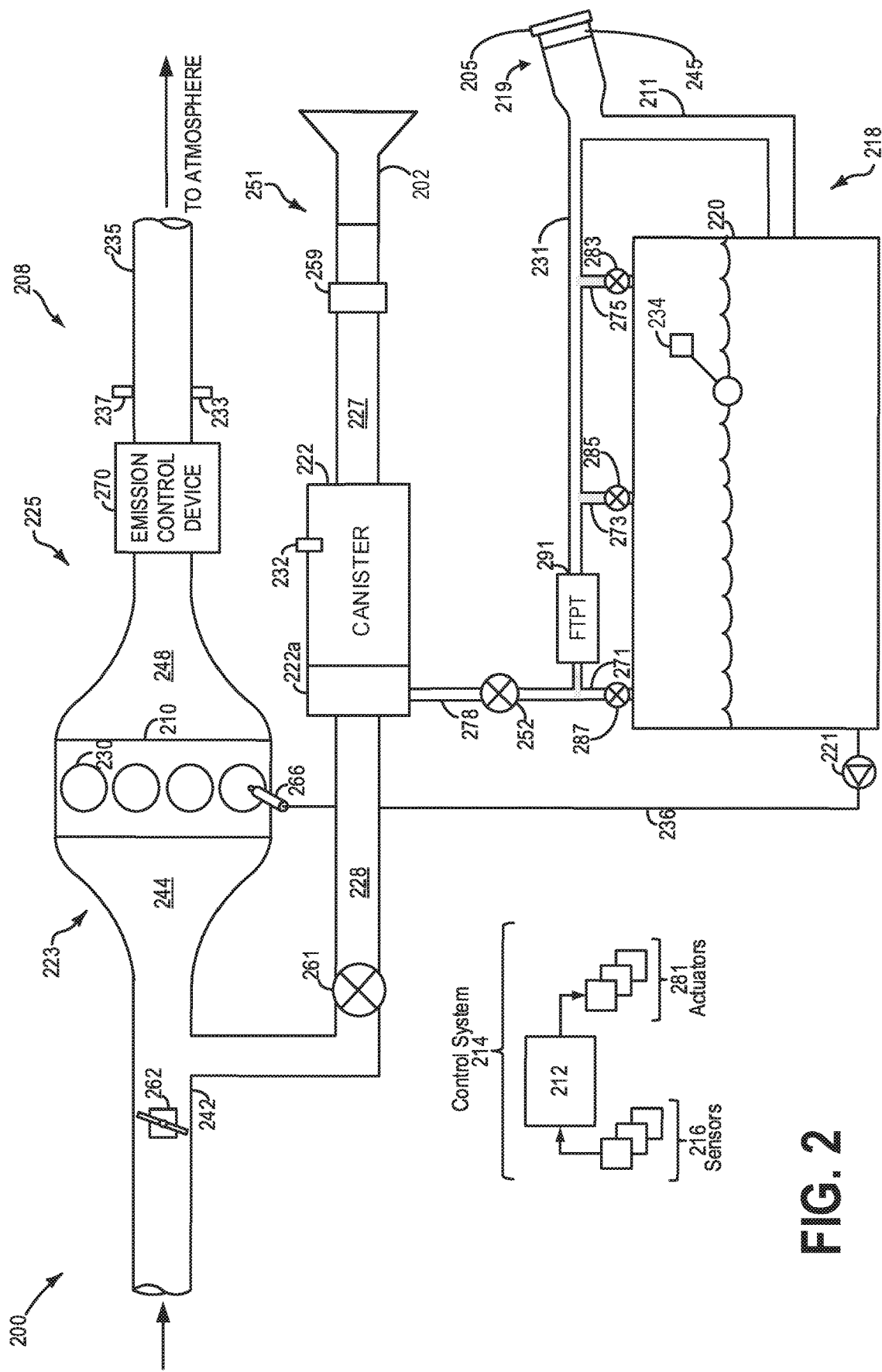
FIG. 2 shows a schematic diagram of an engine system configured with the conical vent line guard in the EVAP system.

FIG. 2 shows a schematic depiction of a vehicle system 200 that may be adapted with the vehicle propulsion system 100 of FIG. 1. The vehicle system 200 includes an engine system 208 coupled to an emissions control system 251 and a fuel system 218. Emissions control system 251 includes a fuel vapor container or canister 222 which may be used to capture and store fuel vapors. In some examples, vehicle system 200 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to an engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel or gasoline particulate filter, oxidation catalyst, etc. In some examples, the exhaust manifold 248 may be configured with exhaust gas recirculation (not shown), coupling the exhaust manifold to the intake passage 242 upstream of the engine intake 223 to mix burnt gas with intake air prior to re-combustion. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a single type of fuel or store a plurality of fuel blends, including fuel with a range of alcohol concentrations, such as various gasoline-ethanol blends, including E10, E85, gasoline, etc., and combinations thereof.

Fuel level sensor 234 located in fuel tank 220 may provide an indication of the fuel levels ("Fuel Level Input") to controller 212 of control system 214, which may be the control system 190 of FIG. 1. As depicted, fuel level sensor 234 may comprise a float connected to a variable resistor. Alternatively, other types of fuel level sensors may be used.

Fuel line 236 couples the fuel tank 220 to the engine 210 and fuel from fuel system 218 may be pumped to each cylinder of the plurality of cylinders 230 by the injector 266 and combusted in each cylinder along with air. Vapors generated in fuel system 218 may be routed to the emissions control system 251. Emissions control system may be an evaporative emissions control (EVAP) system 251 and includes the fuel vapor canister 222 fluidly coupled to the fuel tank 220. Vapors in fuel system 218 may be channeled to a vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves are in conduits 271, 273, or 275. Among other functions, fuel tank vent valves may allow the fuel vapor canister 222 of the EVAP system 251 to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. The fuel cap locking mechanism may alternatively be a latch or clutch, which, when engaged, prevents the removal of the fuel cap.

The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm. In other embodiments, refueling lock may be a refueling door lock or locked using an electrical mechanism.

EVAP system 251 may include one or more emissions control devices, such as one or more of the fuel vapor canister 222 filled with an appropriate adsorbent, the canister configured to temporarily trap fuel vapors (including vaporized hydrocarbons) during fuel tank refilling operations and "running loss" (that is, fuel vaporized during vehicle operation). In one example, the adsorbent used is activated charcoal. EVAP system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein between the canister 222 and a conical guard 202 at an open end of the vent line 227, opposite of an end coupled to the canister 222.

The conical guard 202 may be a device arranged at a terminal end of the vent line 227 where air that has passed through the canister 222 may exchange with air surrounding and external to the EVAP system 251. The conical guard 202 may include a screen disposed at one end that is adapted with small openings that allow air to flow through but provides a barrier to foreign objects. More specifically, the conical guard 202 may block entry of mobile organisms, such as insects and spiders, as well as inanimate particulate matter into the vent line 227. Some examples of the conical guard 202 may additionally be adapted to trap and release debris, e.g., particulate matter sufficiently small in diameter to enter the conical guard 202. Details of a geometry of the conical guard 202 and effects of the conical guard 202 on air flow through the vent line 227 are discussed further below with reference to FIGS. 4-15.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by the controller 212 in a plurality of modes by selective adjustment of the various valves and solenoids. For example, the fuel system may be operated in a fuel vapor storage mode (e g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve 252 may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise one portion of a plurality of portions of the control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located downstream of the emission control device, canister temperature sensor 232, and fuel tank pressure sensor (FTPT) 291. Other sensors such as pressure, temperature, air/fuel ratio, and composition sensors may be coupled to various locations in the vehicle system 200. As another example, the actuators may include fuel injector 266, throttle 262, fuel tank isolation valve 252, fuel pump system 221, and refueling lock 245. The controller 212 may receive input data from the various sensors, process the input data, and trigger the actuators in response to the processed input data based on instructions or code programmed therein (e.g., programmed and stored on a memory of the controller) corresponding to one or more routines. For example, in response to canister temperature sensor 232 detecting a rise in temperature above a threshold temperature, due to saturation of the adsorbent, the controller 212 may instruct closing of the fuel tank isolation valve 252 and opening of the purge valve 261 to facilitate desorption of fuel vapors from the canister 222.

Figure 3A:
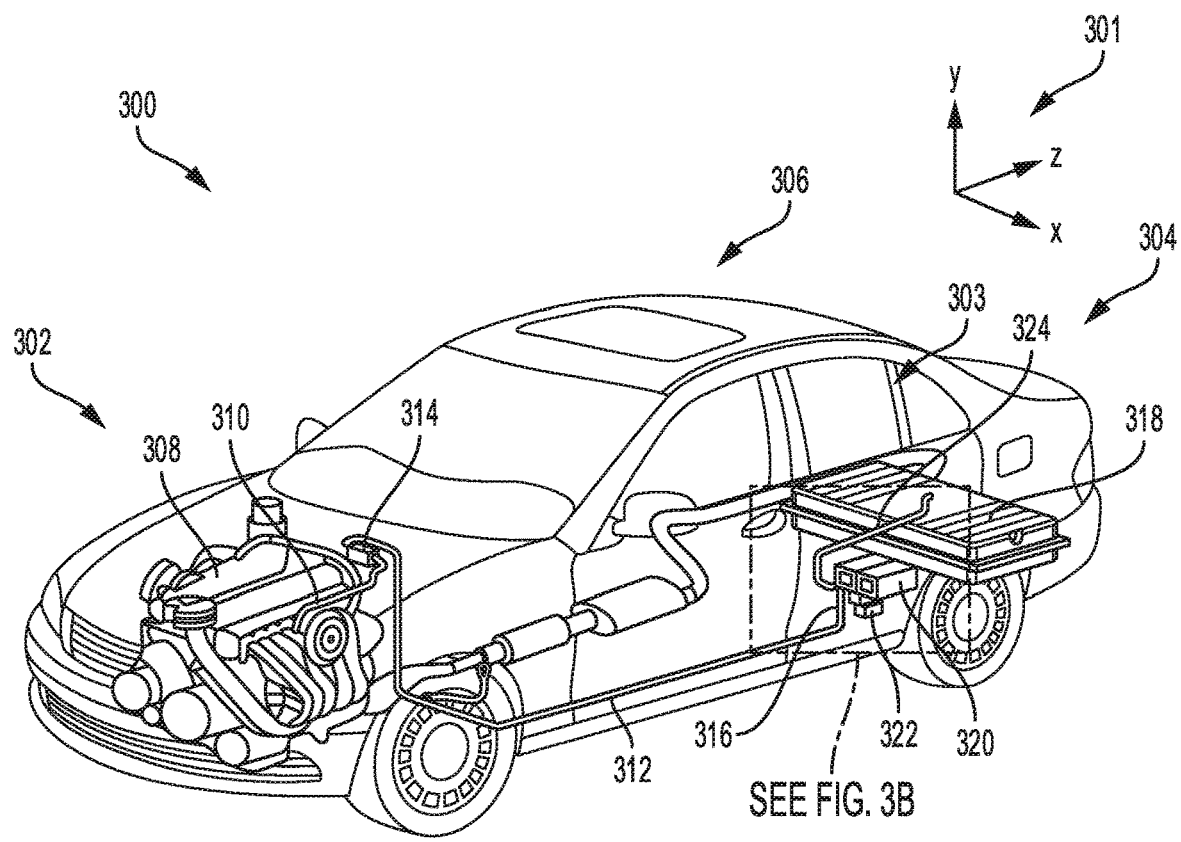
FIG. 3A shows an example of a vehicle adapted with the EVAP system, illustrating a positioning of components of the EVAP system
Figure 3B:
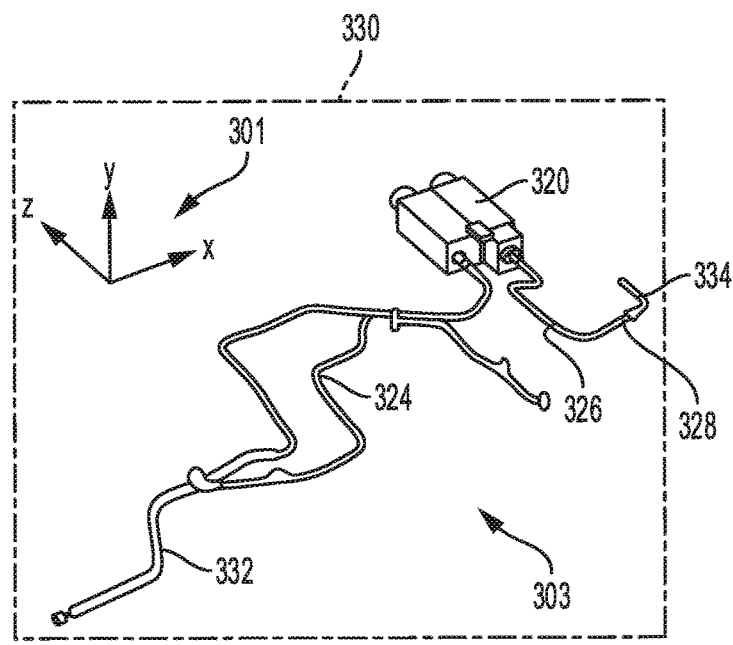
FIG. 3B shows an expanded view of the EVAP system of FIG. 3A.

An arrangement of an EVAP system 303, which may be the EVAP system 251 shown in FIG. 2, within a vehicle is depicted in an example of a vehicle 300 in FIG. 3A. A set of reference axes 301 are provided, indicating a y-axis, an x-axis, and a z-axis. In some examples the y-axis may be parallel with a vertical direction, the x-axis parallel with a horizontal direction, and the z-axis parallel with a lateral direction. The vehicle 300 has a front end 302, a rear end 304, and a cabin 306 in a central region of the vehicle 300. The front end 302 may include an engine system 308, e.g., the engine system 208 of FIG. 2, coupled to a first end 310 of a fuel vapor line 312. A canister purge valve 314 may be disposed along the fuel vapor line 312 proximate to the first end 310. The fuel vapor line 312 may extend along and below the cabin 306 and connect, at a second end 316, to a fuel tank 318, which may be the fuel tank 220 shown in FIG. 2. The fuel tank 318 may be positioned at or proximate to the rear end 304 of the vehicle 300.

A fuel vapor canister 320 may be arranged adjacent to the fuel tank 318, coupled to a canister vent valve 322. The fuel vapor canister 320 may be connected to the fuel tank 318 by a vapor load line 324. The vapor load line 324 channels fuel vapors from the fuel tank 318 through the fuel vapor canister 320 before releasing fresh air to the atmosphere. A vent line 326, shown in an insert 330, providing an expanded view of the EVAP system 303, may extend from the fuel vapor canister 320, under the fuel tank, with an open end 328 that delivers fresh air that has been purified through the fuel vapor canister 320, enabling exchange between air in the vent line 326 and ambient air. The vent line 326 is also shown in insert 330. Note that EVAP system 303 shown in the insert 330 in FIG. 3B is viewed from a different angle than the vehicle 300 in FIG. 3A.

The vent line 326 may be coupled to a guard 334 at the open end 328 of the vent line 326. The guard 334 may be a device that blocks objects from entering the vent line 326 at the open end 328. In some examples, the guard may be cylindrical in geometry and uniform in diameter, with a linear, arcuate, or sinuous overall shape and may include various vents, slots, or apertures to allow air to flow out of the vent line 326 through the guard 334 while barring infiltration by objects (e.g., large particulates and mobile organisms). In another example, the guard 334 may be the conical guard 202 of FIG. 2, adapted with a shape that reduces restriction in air flow imposed by a size of the vents, slots, or apertures of the conical guard, thereby reducing a drop in pressure across an outlet/inlet of the conical guard compared to conventionally shaped examples of the guard 334. Reducing the pressure differential may decrease a likelihood of premature shut-off (PSO) during refueling events where a nozzle used to deliver gasoline to the fuel tank is configured to shut off when a pressure in the fuel tank rises above a threshold.

The fuel vapor canister 320 may also be connected to the engine system 308 by a vapor purge line 332, the vapor purge line 332 depicted in the insert 330. The vapor purge line 332 provides a conduit for delivery of fuel vapors desorbed from an adsorbent of the fuel vapor canister 320 to the engine system 308 during a purge event. The vapor purge line 332 may include a purge valve, e.g., the purge valve 261 of FIG. 2, (not shown in FIGS. 3A-3B) controlling flow of gas between the fuel vapor canister 320 and the engine system 308.

During refueling, a gas volume in the fuel tank decreases as a fluid volume in the tank increases. To mitigate pressure rise in the tank, the canister vent valve may be opened to allow gases from the fuel tank to vent to the atmosphere after passing through the fuel vapor canister and into the vent line. The positioning of the guard at the open end of the vent line, however, may restrict flow out of the vent line due to a narrow diameter of openings in the guard, configured to block intrusive matter from entering the vent line. The restriction in flow may result in undesirable pressure accumulation upstream of the guard, manifesting as a pressure drop across the guard.

Furthermore, stringent regulations on automatic shut-off systems on nozzles used to deliver fuel to the fuel tank during refueling may be highly sensitive to flow restrictions in the EVAP system. Variations in flow rates between different refueling systems may lead to nozzle shut-off at inconsistent levels of fuel in the fuel tank. In particular, if the guard includes vents or openings along more than one surface of the guard, e.g. in a screen of the guard aligned perpendicular to a length of the guard as well as side walls of the guard, flow rates in and out of the EVAP system may fluctuate significantly.

Similarly, during purging of the fuel vapor canister, flow of air drawn into the vent line to flush the fuel vapor canister may be impeded by the guard, resulting in inefficient purging of the fuel vapor canister absorbent. In order to improve air flow in both directions and maintain a uniform flow rate through the guard, one end of the guard may be adapted with a conical geometry. The conical guard may have a first end with a wide diameter that tapers to a point mid-way along a length of the conical guard and continuing to a second end with a uniform, narrower diameter. While a conical surface of the guard may be solid and fluidly impenetrable, the conical guard may have a screen arranged at an inlet/outlet end of the conical guard at which air from an EVAP system may exchange with ambient air.

Figure 5:
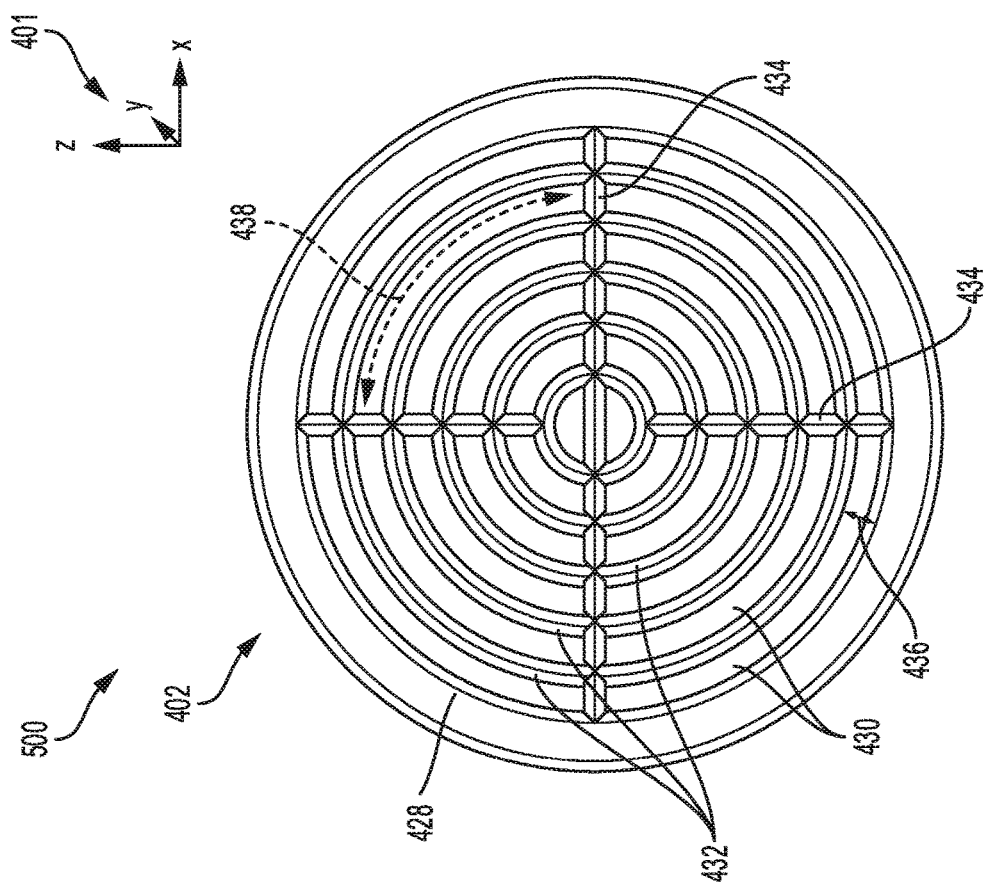
FIG. 5 shows a top-down view of the example of the conical guard.
Figure 4:
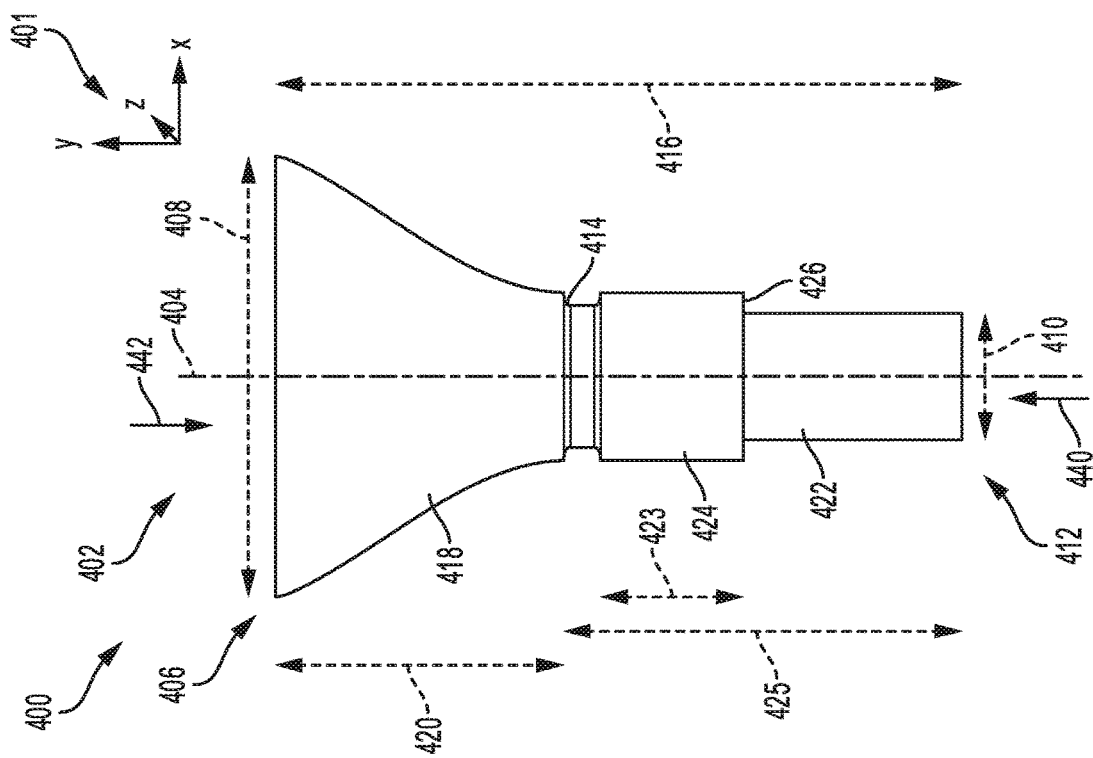
FIG. 4 shows a profile view of an example of the conical guard for the vent line.
Figure 6:
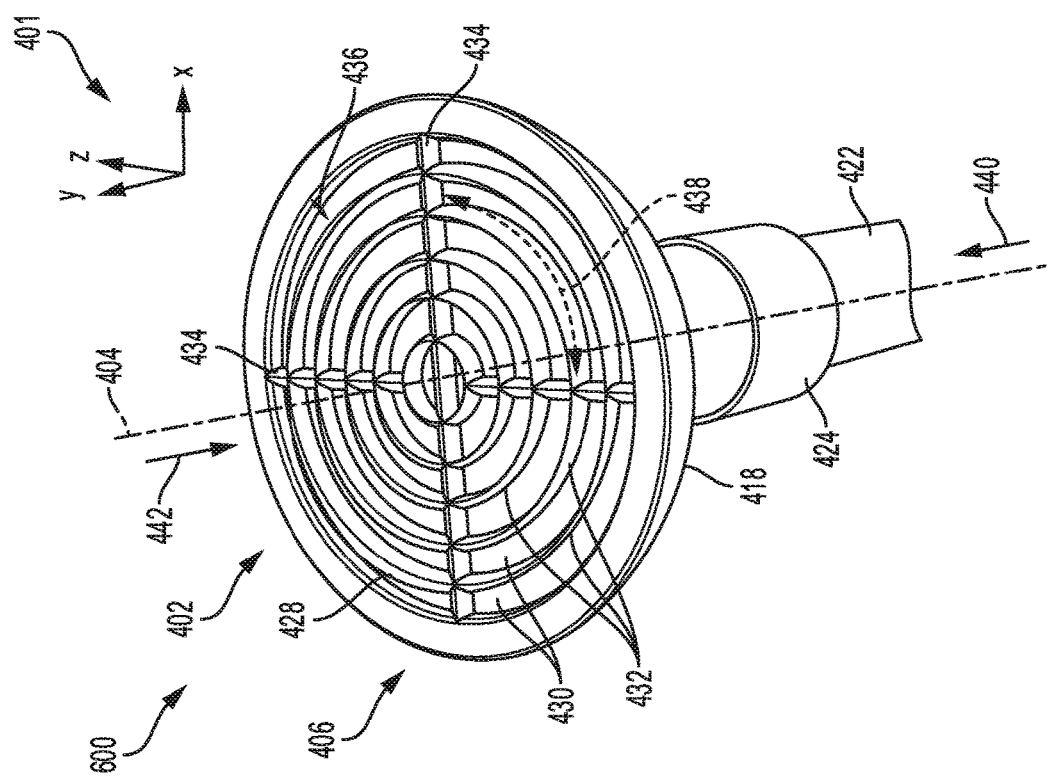
FIG. 6 shows a perspective view of the example of the conical guard.
Figure 7:
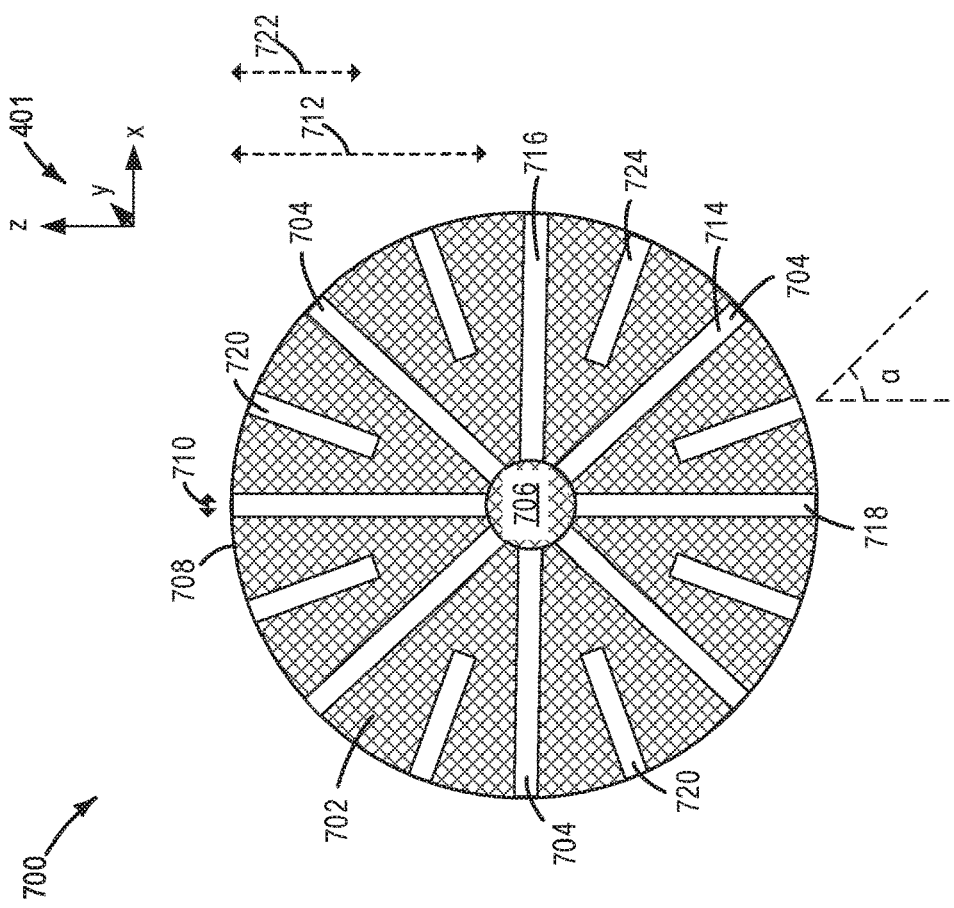
FIG. 7 shows a first alternate embodiment of a screen of the conical guard.

An example of a conical guard 402 is shown in FIGS. 4-6, showing a profile view 400, a top-down view 500, and a perspective view 600, respectively, of the conical guard 402. FIGS. 4-6 are discussed collectively below and are similarly numbered. The conical guard 402 may be adapted to block mobile organisms as well as particulate matter similar in size to the mobile organisms. A set of references axes 401 are provided for comparison between views shown in FIGS. 4-6.

As shown in FIGS. 4-6, the conical guard 402 may have a hollow (e.g., open at both ends), outer shape that generally resembles a flanged cylinder, with a central axis 404 that is parallel with the y-axis, as shown in FIG. 4. A cross-section, taken along an x-z plane, of the conical guard 402 may be circular, as shown in the top-down view 500 of FIG. 5 and perspective view 600 of FIG. 6. The conical guard 402 has a first end 406 with a first diameter 408, as shown in FIG. 4, the first diameter 408 perpendicular to the central axis 404, parallel with the x-axis, and wider than a second diameter 410 of a second end 412 of the conical guard 402. The first diameter 408 of the conical guard 402 tapers inwards, towards the central axis 404, from the first end 406 towards the second end 412, narrowing to equal the second diameter 410 of the second end 412 at a mid-point 414 along a length 416 of the conical guard 402, the length 416 parallel with the central axis 404.

A portion of the conical guard 402 between the first end 406 and the mid-point 414 may be a cone 418 of the conical guard 402, as shown in FIG. 4. A length 420 of the cone 418, defined along the y-axis and parallel to the central axis 404, may form a portion of the length 416 of the conical guard 402 such as 30%, 40%, or 50%. The cone 418 may have an outer surface that is curved and slightly sinusoidal along the length 420 of the cone 418 and impervious to air flow. In other examples, however, the outer surface of the cone 418 may taper linearly from the first end 406 to the mid-point 414.

A remaining portion of the length 416 of the conical guard that is not formed from the cone 418 may be uniform in diameter (e.g., having the second diameter 410). The remaining portion, between the mid-point 414 and the second end 412 of the conical guard 402, may be a stem 422. The stem 422 may include a collar 424 that surrounds a portion of the stem 422. The collar 424 may have a diameter, defined along the x-axis, that is larger than the second diameter 410 of the second end 412 of the conical guard 402 but narrower than the first diameter 408 of the first end 406. A length 423 of the collar 424, measured along the y-axis, may be uniform around a circumference of the collar 424. The length 423 of the collar 424 may be less than a length 425 of the stem 422, representing a portion of the length 425 of the stem 422 such as 30% or 40%. The collar 424 may be positioned below the cone 418, with respect to the y-axis, and act as a stopping point for coupling of a conduit to the conical guard 402.

For example, a vent line of an EAP system, such as the vent line 227 of the EVAP system 251 of FIG. 1 as well as the vent line 326 of the EVAP system 303 of FIG. 3B, may be adapted with an inner diameter similar to the second diameter 410 of the second end 412 of the conical guard 402. The conical guard 402 may be coupled to an open end of the vent line by inserting the stem 422 at the second end 412 of the conical guard 402 into the open end of the vent line. The stem 422 may be pushed into the vent line as far as a bottom edge 426 of the collar 424. The wider diameter of the collar 424 compared to the inner diameter of the vent line inhibits further insertion of the conical guard 402 into the vent line.

As described above, the stem 422 of the conical guard 402 may engage with the vent line of the EVAP system. The first end 406 of the conical guard 402 may be a terminal element in the EVAP system where air is exchanged between the EVAP system and ambient atmosphere. The conical guard 402 may include a screen 428, as shown in FIGS. 5 and 6, adapted with small openings 430 at the first end 406. The openings 430 define flow passages for air passing through the conical guard 402. The screen 428 is depicted FIGS. 5 and 6 as a thin, as defined along the y-axis, disc that entirely covers an area, e.g., a circular area co-planar with the x-z plane, of the first end 406 of the conical guard 402.

Each of the openings 430 may be bordered by rings 432 and spokes 434, as shown in FIGS. 5 and 6. The rings 432 may be arranged concentrically within the screen 428, each ring of the rings 432 separated from adjacent rings 432 by widths 436 of the openings 430, the openings 430 also circular and arranged concentrically. The screen 428 may be divided into quadrants by the spokes 434, a positioning of the spokes 434 in a cross-pattern defining radial lengths 438 of the openings 430. The spokes 434 may provide structural support to the screen 428, connecting the rings 432 and maintaining positions of the rings 432 within the screen 428.

The rings 432 may be spaced apart according to desired widths 436 of the openings 430. For example, the screen 428 may be configured to impede entry of spiders into the conical guard 402 and vent line of the EVAP system. The widths 436 of the openings 430 may be sufficiently small, for example, at most 1.5 mm, so that spiders, as well as other mobile organisms and large particles of debris that are similar in size to the mobile organisms, may not crawl or be drawn in through the openings 430. In some examples, the width 430 may vary among each ring of the rings 432 to achieve uniform distribution of the flow through the cone 418.

As a result of the size of the openings 430 of the screen 428, air flow through the screen 428 may experience restriction. During refueling air may flow out of the conical guard 402 in a direction indicated by arrow 440 shown in FIGS. 4 and 6. The flow of air through the conical guard 402 vents pressure in a fuel tank as fuel is added. As air flow velocity out of the vent line is slowed by the screen 428, pressure in the stem 422, reflection a pressure in the fuel tank and the vent line, of the conical guard 402 may increase and become higher than ambient pressure, .e.g., pressure on an opposite side of the screen 428 from the conical guard 402 and outside of the conical guard 402. The increase in pressure in the conical guard 402 may lead to premature shut-off (PSO) during refueling events as well as generating backpressure that may degrade a fuel tank. Thus decreasing pressure in the conical guard 402 is desirable.

By configuring the conical guard 402 with the cone 418, a diffusing effect may be leveraged to offset the restriction in air flow imposed by the small openings 430 of the screen 428. The pressure in the conical guard 402 may be at least partially dissipated by widening the diameter of the conical guard 402 which may be achieved by adapting the conical guard 402 with the geometry shown in FIGS. 4 and 6. The increase in diameter of the conical guard 402 from the mid-point 414 to the first end 406 increases an inner volume of the conical guard 402, thereby decreasing pressure. The cone 418 may also reduce flow velocity through the screen 428 as the flow becomes distributed over a wider area. The reduction in flow velocity may thereby reduce flow restriction. The decrease in pressure facilitated by increasing the diameter of the conical guard 402 may offset the increase in pressure caused by the screen 428 of the conical guard 402. As an example, a ratio of the first diameter 408 at the first end 406 to the second diameter 410 at the second end 412 of the conical guard 402 may be greater than 1. More specifically, the ratio may be between 2 and 3 and a ratio of the first diameter 408 at the first end 406 to the length 416 of the conical guard 402 may be less than 1.5. Accordingly, in one example, the pressure drop across the screen 428 of the conical guard 402 may be decreased by 37% compared to a conventional guard with a uniform diameter, thus reducing the probability of premature shut-off relative to the conventional guard.

In addition, the arrangement of the screen 428 within the first end 406 of the conical guard 402 positions the openings 430 along a single planar surface of the conical guard 402. Thus, air may flow in and out of the conical guard along a single direction aligned with the central axis 404. Turbulent flow within the conical guard 402 is minimized, allowing greater control over flow velocity entering and exiting the first end 406.

During purging of the fuel vapor canister, air is drawn into the conical guard 402 in a directed indicated by arrow 442, as shown in FIGS. 4 and 6. Flow velocity into the conical guard 402 may be slowed by the screen 428, resulting from the small size of the openings 430, and lead to inefficient purging of the fuel vapor canister. A pressure differential may form where pressure outside of the conical guard 402 is higher than pressure inside the conical guard 402. The decrease in diameter from the first end 406 of the conical guard 402 to the mid-point 414 creates a constriction that forces an increased flow velocity through the conical guard 402 and delivers air to the fuel vapor canister at a suitable rate for purging. The faster flow through the conical guard 402 may decrease the pressure gradient across the screen 428.

For example, the conical guard 402 may be configured to have a ratio of the first diameter 408 at the first end 406 to the second diameter 410 at the second end 412 of the conical guard 402 between 2 and 3 as well as a ratio of the first diameter 408 at the first end 406 to the length 416 of the conical guard 402 of less than 1.5. The conical guard 402 acts as a nozzle when air flows into the conical guard 402 from the surrounding atmosphere. As a result, the pressure drop across the screen 428 may be reduced by 40% relative to a conventional guard with a uniform diameter. The ratio of the diameters and ratio of diameter to length may be adjusted according to a geometry of the EVAP system to which the conical guard 402 is coupled to. As an example, if the conical guard 402 is positioned in a vehicle with reduced available space for the first diameter 408 at the first end 406, e.g., a narrower conical guard is used, the length 416 of the conical guard 402 may be adjusted accordingly to maintain a desired pressure gradient across the screen 428 and flow velocity through the conical guard 402. The first end 406 may alternatively have an oval shape if demanded by space/packaging constraints in the vehicle.

The conical guard may be a relatively low cost device that is easily adapted to an EVAP system of a vehicle. A manufacturing cost of the conical guard may be maintained low by forming the conical guard from plastic. Thus, the conical guard may be fabricated by conventional methods for producing plastic parts, such as injection molding.

It will be appreciated that the example of the conical guard 402 shown in FIGS. 4-6 is a non-limiting example and variations in the geometry of the conical guard have been contemplated. For example, flow passages, defined by openings, e.g., the openings 430 of FIG. 4, of a screen of a conical guard may be peripherally arranged, as depicted in FIGS. 4-6, as concentric annular openings, or may alternatively be radially arranged, as shown in an example of a screen 700 shown in FIG. 7.

The screen 700 includes a plurality of openings disposed in a radial pattern in a frame 702 of the screen 700. The frame 702 may be a solid disc that blocks air flow except through the plurality of openings, defining flow passages, of the screen 700. The screen 700 has a first set of flow passages 704 that extend linearly from a center 706 of the frame 702 to a peripheral edge 708 of the frame 702. A width 710 of each of the first set of flow passages 704 may be perpendicular to a length 712 of each of the first set of flow passages 704 and the width 710 may be adapted to be suitably narrow, such as 1.5 mm wide or less, to inhibit passage of foreign objects and mobile organisms.

Each flow passage of the first set of flow passages 704 may radiate from the center 706 of the frame 702 at uniform angles relative to adjacent flow passages of the first set of flow passages 704. For example, a first flow passage 714 of the first set of flow passages 704 may be oriented at an angle α of 45 degrees with respect to an adjacent second flow passage 716 and another adjacent third flow passage 718, oppositely positioned from the second flow passage 716.

The screen 700 may include a second set of flow passages 720 that may be similar in width to the width 710 of the first set of flow passages 704 but with a shorter length 722 than the length 712 of the first set of flow passages 704. The second set of flow passages 720 may extend from a point mid-way between the center 706 and the periphery 708 of the screen 700, each flow passage of the second set of flow passages 720 arranged between the flow passages of the first set of flow passages 704. Thus the screen 700 has a pattern of radially disposed flow passages formed by an alternating arrangement of flow passages from the first set of flow passages 704 and flow passages from the second set of flow passages 720. For example, a first flow passage 724 of the second set of flow passages 720 may be positioned between and evenly spaced apart from the first flow passage 714 and the second flow passage 716 of the first set of flow passage 704.

Although the screen 700 is shown with eight flow passages of each of the first set of flow passage 704 and second set of flow passages 720, other quantities of the radially oriented flow passages have been envisioned. The screen may, for example, be configured with more flow passages with each flow passage spaced closer to adjacent flow passages or fewer flow passage with each flow passage spaced further from adjacent flow passages than the example shown in FIG. 7.

The radial arrangement of the flow passages, e.g., the first set of flow passages 704 and the second set of flow passages 720, in the screen 700 of FIG. 7 may position all the flow passages equidistant from the center 706 of the screen. The radial arrangement of the flow passages increases flow through an outer periphery of the screen 700 and reduces flow through the center 706. As such, swirling induced along the outer periphery of the screen 700 is enhanced, thereby increasing the centrifugal effect and separating dust more efficiently.

A shape of a screen of a conical guard may also be varied to produce a desired effect on air flow therethrough. An example of a conical guard 800 is shown in FIG. 8 with a domed screen 802 coupled to a cone 804 of the conical guard 800. A stem 806 of the conical guard 800 may extend below the cone 804, along a central axis 801 of the conical guard 800. The domed screen 802 may curve upwards, with respect to the y-axis, along the central axis 801 and away from the stem 806.

By adapting the conical guard 800 with the domed screen 802, a likelihood of complete obstruction of air flow through the domed screen 802 may be decreased when an object comes into contact with the domed screen 802 and at least partially covers the domed screen 802. In particular, during purging of a fuel vapor canister, a drawing of air into a vent line through the conical guard 800 may result in a lightweight object with a large surface area, such as a tree leaf, to be pulled over the domed screen 802 of the conical guard. The object may entirely cover a screen that is flat with a planar surface aligned perpendicular to the central axis 801, such as the conical guard 402 shown in FIGS. 4-6, thereby impeding delivery of air to the fuel vapor canister. When the screen is domed, however, e.g., the domed screen 802 of FIG. 8, a surface area of the domed screen 802 is increased with respect to a flat screen with a similar diameter. A probability that all openings of the domed screen 802 become blocked by the obstructing object is reduced, allowing at least a portion of the openings to remain clear and open to air flow. In a vehicle where packaging space for the conical guard is reduced due to proximity of surrounding vehicle components, a conical guard with a flat screen may be desired. The proximity of the surrounding components may aid in blocking large debris, such as tree leaves, from reaching the conical guard. However, if the conical guard is located in restricted, in a relatively open space, and packaging is not a constraint, use of the conical guard 800 of FIG. 8 with the domed screen 802 may be advantageous.

The examples of a conical guard shown in FIGS. 3A-8 may be adapted to mobile organisms and particulate matter with dimensions large enough that openings of 1.5 mm width in a screen of the conical guard are sufficient to impede entry of the mobile organisms and particulate matter. However, the conical guard may be used on a vehicle EVAP system in an environment where high concentrations of fine particulate matter (also, debris), such as dust, has a high likelihood of becoming air borne and aspirated into the conical guard during fuel vapor canister purging. This may occur in regions with high levels of pollution or arid climates with large areas of exposed land. The dust, with dimensions smaller than the openings in the screen of the conical guard, may pass through the screen into the conical guard and aggregate in a vent line of the EVAP system, leading to severe flow restriction over time.

In some examples, ingestion of small diameter debris, such as dust, may be mitigated by adapting the EVAP system with a dust box arranged at a point along the vent line, upstream of the fuel vapor canister. The dust box may be used in addition to the conical guard to block ingestion of dust and entry of mobile organisms but both the dust box may be prone to multiple replacement events over the vehicle's lifetime. A use of both the dust box and the conical guard may add costs to the EVAP system that may become burdensome in regions with high levels of airborne particulate matter and high populations of small, mobile organisms attracted to fuel vapors.

A cost and number of components associated with maintaining the EVAP system free of debris and mobile organisms may be reduced by adapting the conical guard to trap debris in addition to presenting a barrier to mobile organisms. While configuring the screen of the conical guard with very small openings may hinder ingestion of debris, it may not be desirable to further decrease a width of the openings due to restrictions on air flow in and out of the conical guard imposed by the width of the openings. The issue of dust aspiration into the vent line may be addressed by adapting the conical guard with angled openings that induce a cyclonic pattern of flow upon air entering the conical guard. A second embodiment of a screen 902 is shown in a top-down view 900 in FIG. 9. The screen 902 may be used similarly as the screen 428 of FIGS. 5 and 6, arranged at a first end of a conical guard, with respect to the first end 406 of the conical guard 402 shown in FIG. 4.

Figure 9:
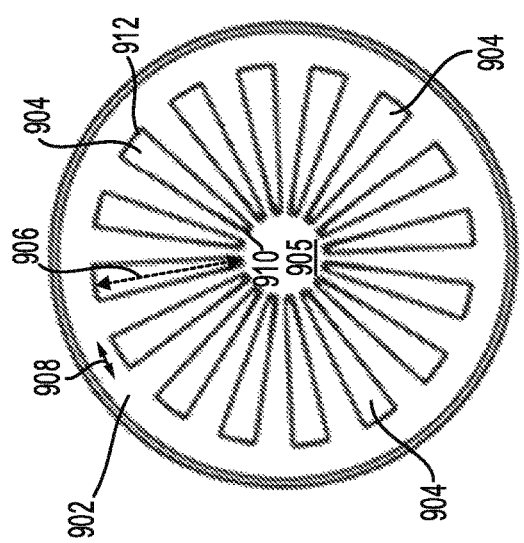
FIG. 9 shows a second alternate embodiment of a screen of the conical guard that may assist in trapping debris in addition to blocking mobile organisms.

In FIG. 9, the screen 902 has a circular outer geometry with openings 904 disposed in the screen, evenly spaced apart around a circumference of the screen 902. Each opening of the openings 904 may be identical and may have a pentagonal shape with a length 906 that is greater than a width 908 of each opening of the openings 904. The openings 904 may be apertures extending through a thickness, measured along the y-axis, of the screen 902 so that air on either side of the screen 902 is directly coupled through the openings 904.

The length 906 of each opening of the openings 904 may not vary across the width 908 but the width 908 may vary with the length 906. For example, an inner end 910 of the openings 904 may have a narrower width 908 than an outer end 912 of the openings 904 so that the openings 904 taper towards a central region 905 of the screen 902. The central region 905 may be solid surface that is impervious to air flow. At the wider outer end 912 of the openings, the width 908 of the openings may be 1.5 mm, sufficiently narrow to block small mobile organisms.

Figure 10:
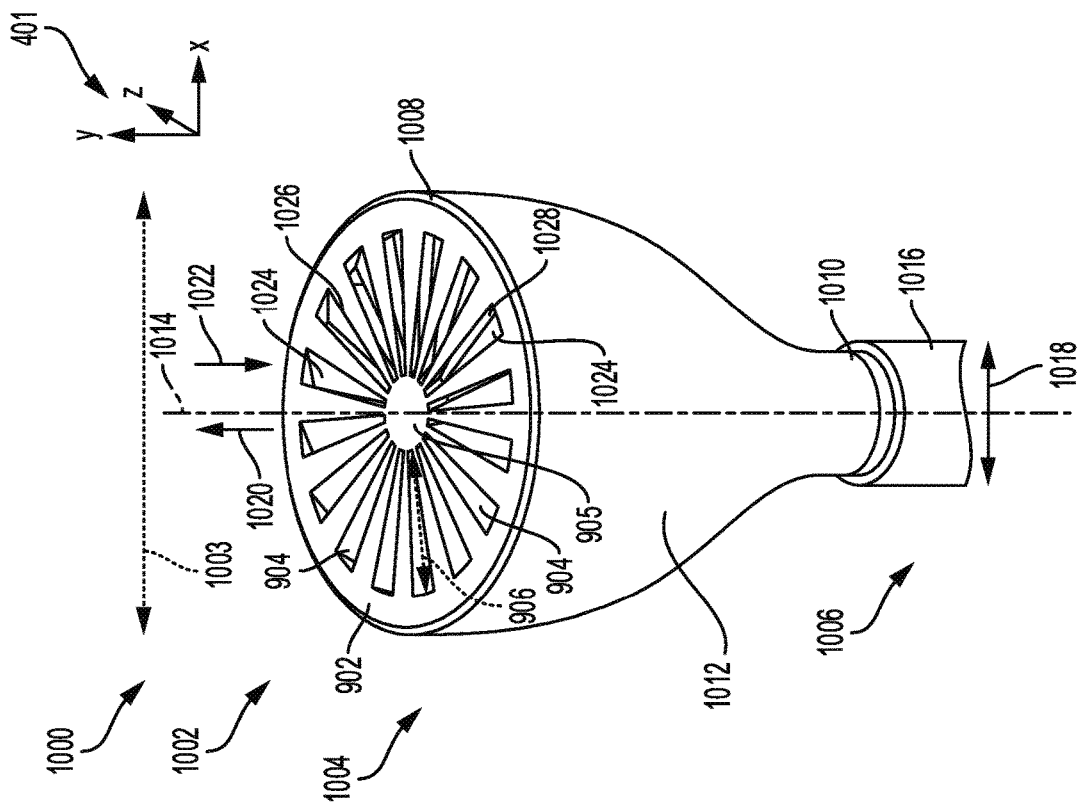
FIG. 10 shows a perspective view of an example of the conical guard adapted with the screen of FIG. 9.

The screen 902 is shown from a perspective view 1000 in FIG. 10, coupled to a conical guard 1002. The conical guard 1002 may be similar to the conical guard 402 shown in FIGS. 4-6 and may include an upper portion 1004 positioned above a lower portion 1006. The upper portion 1004 includes the screen 902 covering an upper (relative to the y-axis) opening of the upper portion 1004. The upper portion 1004 may have conical outer shape, similar to the cone 418 of the conical guard 402 of FIGS. 4-6. The upper portion 1004 of the conical guard 1002 in FIG. 10, however, may decrease in diameter 1003 more gradually from a top 1008 of the conical guard 1002 to a mid-point 1010 of the conical guard 1002 than the cone 418 of FIGS. 4-6. A wall 1012 of the upper portion 1004 may be curved, transitioning between a convex curvature, away from a central axis 1014 of the conical guard 1002, and a concave curvature, towards the central axis 1014, in a direction from the top 1008 towards the mid-point 1010 of the upper portion 1004.

Figure 13:
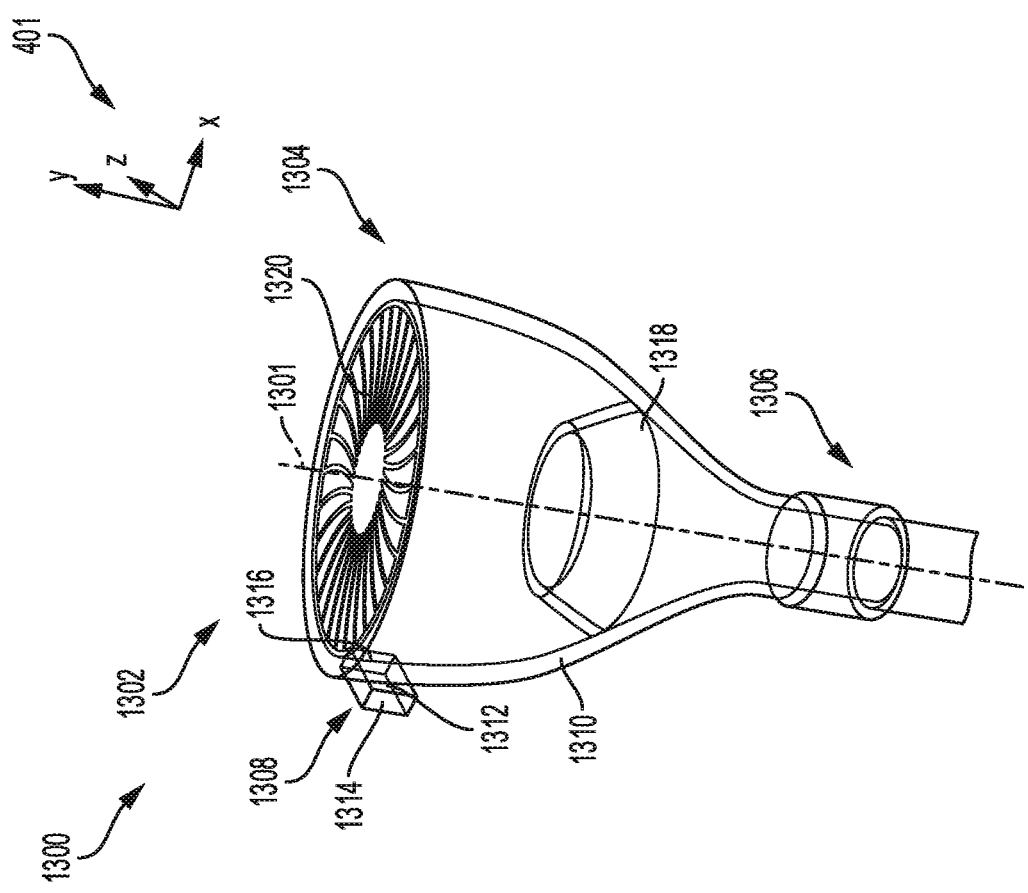
FIG. 13 shows a perspective view of an example of a conical guard adapted to block mobile organisms, trap debris, and expel debris via a particle outlet port.

The lower portion 1006 of the conical guard 1002 may include a collar 1016, arranged below the mid-point 1010 of the conical guard 1002, as well as a stem protruding downwards, along the y-axis, from the collar 1016, as shown in FIG. 13. The collar 1016 may be used similarly as the collar 424 of FIG. 4, encircling a portion of the stem. The collar 1016 may have a wider diameter 1018 than the stem, both adapted with uniform diameters along a height of the stem, the height defined along the y-axis. The stem may have a similar diameter as a diameter of the upper portion 1004 of the conical guard 1002 at the mid-point 1010.

During a re-fueling event, air may flow from a fuel vapor canister, such as the fuel vapor canister 222 of FIG. 2 and 320 of FIGS. 3A-3B, through a vent line and out of an EVAP system through the conical guard 1002 in a direction indicated by arrow 1020. An increase in the diameter 1003 of the conical guard 1002 in the direction indicated by arrow 1020 may increase flow from the vent line and out through the conical guard by decreasing pressure in the conical guard 1002 as the diameter 1003 widens, driving an increase in the flow velocity.

During fuel vapor canister purging, air may be drawn into the conical guard 1002 in a direction indicated by arrow 1022, opposite of the flow direction during re-fueling. The flow of air towards the fuel vapor canister may entrain debris, suspended in air surrounding and external to the conical guard 1002, through the openings 904 of the screen 902 and into the conical guard 1002, aggregating in the vent line of the EVAP system as the debris decelerates while travelling through the vent line. To circumvent accumulation of debris in the vent line during fuel vapor canister purging, the openings 904 of the screen may be adapted with louvers 1024.

The louvers 1024 may be strips formed from a same or different material as the screen 902. The louvers may also be integrated into the screen 902 during fabrication to form a single, unitary piece. The louvers 1024 may have similar lengths, radiating outwards from the central region 905 of the screen 902 as the length 906 of the openings 904. Each strip of the louvers 1024 may be attached along a first edge 1026 of the louvers 1024, the first edge 1026 extending along the lengths of the louvers and coupling to an edge of the openings 904. The louvers 1024 may be angled so that a second edge 1028 of each strip of the louvers 1024, the second edge 1028 opposite of the first edge 1026 and also extending along the lengths of the louvers 1024, is not coupled to the screen 902. The louvers 1024, each louver coupled to one of the openings 904 of the screen 902, may all be identically shaped and identically attached to the openings 904 so that the louvers 1024 extend from each of the openings 904 in a uniform direction and angle.

Figure 11B:
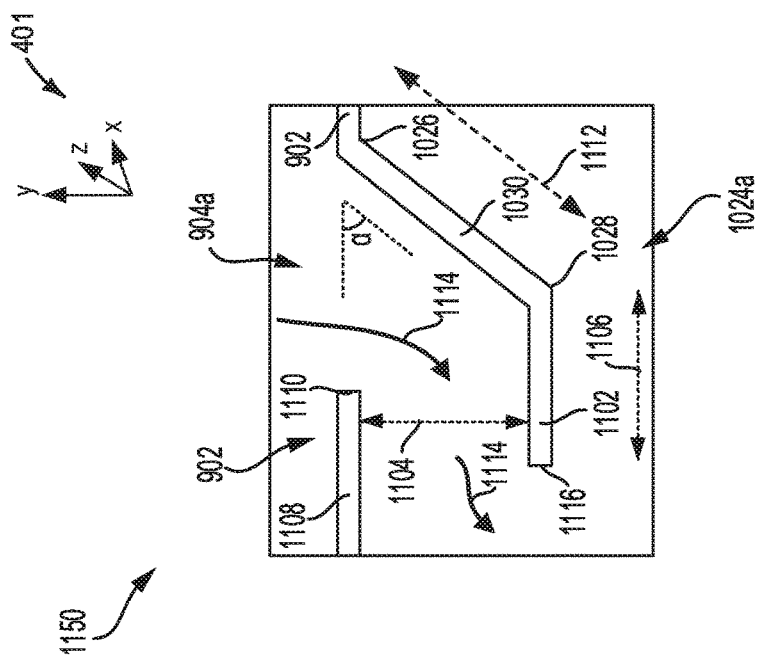
FIG. 11B shows a cross-section across an opening of the screen of the conical guard.
Figure 11A:
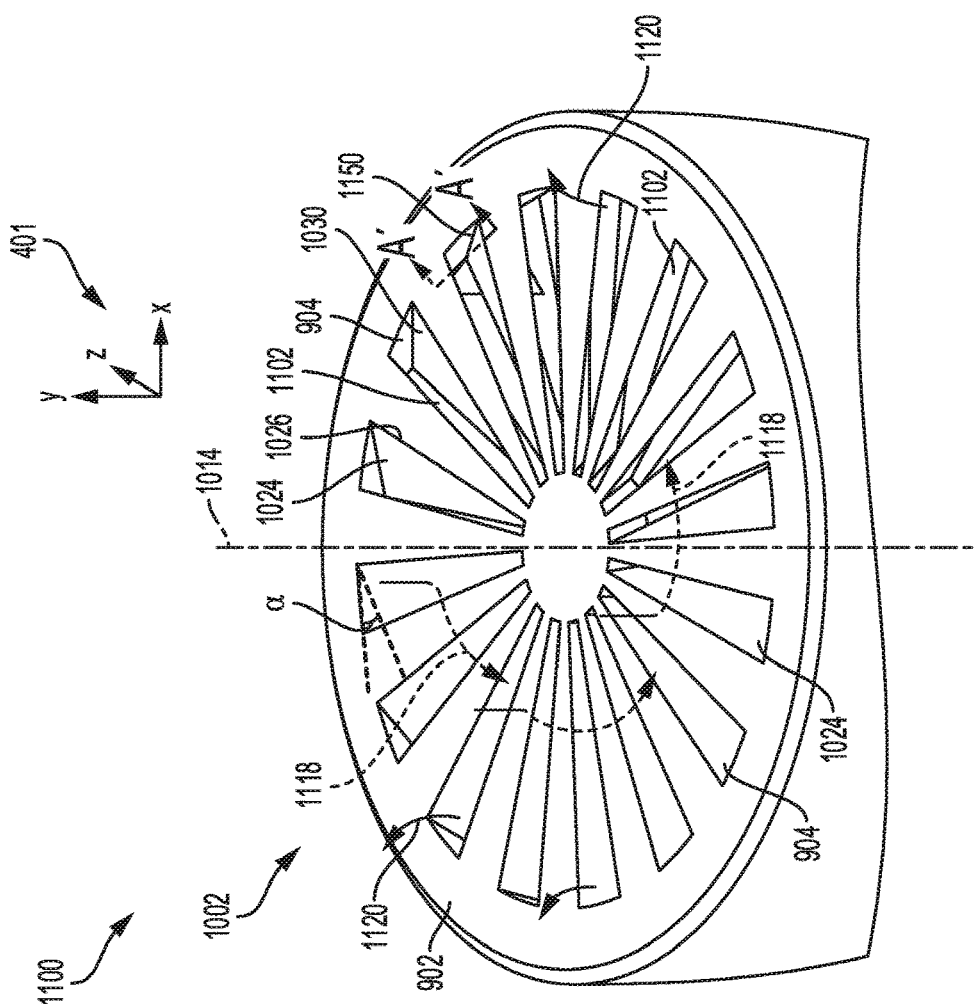
FIG. 11A shows an expanded view of the screen of the conical guard in FIG. 10.

The first edge 1026 and the second edge 1028 of the louvers 1024 may define a first segment 1030, as shown in FIG. 11A, that is angled relative to a plane of the screen 902, as depicted in an expanded view 1100 of the screen 902 in FIG. 11A. The expanded view 1100 provides a view from a similar perspective of the conical guard 1002 depicted in FIG. 10 and shows additional details of the louvers 1024. A tilt angle α formed between the plane of the screen 902 and the first segment 1030 of the louvers 1024 may be an angle between 10 and 80 degrees. Increasing the tilt angle α may increase a gap between a second segment 1102 of each of the louvers and the screen 902.

The second segment 1102 of each of the louvers 1024 may be a flap coupled to the second edge 1028 of the first segment 1030 with a same length as the lengths of the louvers 1024 and aligned parallel with the plane of the screen 902. Details of the louvers 1024 are shown in a cross-section 1150 of a louver 1024a illustrated in FIG. 11B, taken along a line A-A' in FIG. 11A. The second segment 1102 extends from the second edge 1028 of the first segment 1030 in a direction parallel with the screen 902 and spaced away from the screen 902 by a gap 1104. A size of the gap 1104 may be varied according to the tilt angle α as described above. As the tilt angle α increases, the gap 1104 increases and as the tilt angle α decreases, the gap 1104 decreases.

A width 1106 of the second segment 1102 of the louver 1024a may be wide enough to overlap with a solid section 1108 of the screen 902, the solid section 1108 disposed between each of the openings 904. In other examples, however, the width 1106 of the second segment 1102 may not overlap with the solid section 1108 and may instead align with an edge 1110 of an opening 904a of the openings 904 or may be narrower than the opening 904a. Furthermore, in other examples, the louver 1024a may be coupled to the opening 904 of the screen 902 in an opposite orientation so that the louver 1024a is connected to the opening 904a at the edge 1110 on a left-hand side of the opening 904a instead of a right-hand side as shown in FIG. 11B. As such, the louver 1024a may instead extend downwards and to the right. It will be appreciated that the louver 1024a shown in FIG. 11B is a non-limiting example. Variations in a width 1112 of the first segment of the louver 1024a, in the width 1106 of the second segment of the louver 1024a, and in the tilt angle α have been contemplated without departing from the scope of the present disclosure.

Air may flow into the opening 904a along a direction indicated by arrows 1114. Initially, the flow may be aligned with the y-axis but may curve (to the left in FIG. 11B) due to contact with the angled first segment 1030 of the louver 1024a. The flow of air continues curving to the left as the air comes into contact with the second segment 1102 of the louver 1024a and flows beyond an outer edge 1116 of the second segment 1102. The air flow may gradually re-align with the y-axis at some distance, along the y-axis, inside a conical guard such as when the air reaches a lower portion of the conical guard, e.g., the lower portion 1006 of the conical guard 1002 of FIG. 10.

A direction of air flow into the conical guard 1002 is also shown in FIG. 11A, indicated by arrows 1118. A solid portion of the arrows 1118 represents air above a plane of the screen 902, the plane of the screen 902 co-planar with the x-z plane, and a dashed portion of the arrows 1118 represents air below the plane of the screen 902, inside the conical guard 1002. As the air enters the opening 904, the air flow is diverted due to contact with the louvers 1024. When the louvers 1024 are coupled to the screen as shown in FIGS. 11A-11B, the flow of air is turned counter-clockwise, as indicated by arrows 1118. As a result, as the air travels through the conical guard 1002 along the y-axis, the air follows a helical path, forming a vortex within an upper portion of the conical guard 1002. In other words, the flow of air spirals, moving in a circular path in the z-x plane and linearly downwards along the y-axis.

The swirling of the air within the upper portion of the conical guard 1002 generates an angular velocity of flow that imposes a centrifugal force on any objects entrained in the air. For example, debris such as dust may experience the centrifugal force generated by the rotating air flow. Inertia arising from a mass of the dust, large in comparison to the air, causes the dust to spiral through a larger circumference, e.g., rotating around the central axis 1014 with a larger radius, and a slower velocity than the air. A likelihood of the dust contacting an inner surface of the upper portion of the conical guard 1002 is increased relative to the air flow, further slowing the movement of the dust due to friction. The dust may lose enough speed that a large portion of the dust entrained with the air entering the conical guard may remain within the upper portion of the conical guard 1002 and become nearly stationary while the air continues, along the y-axis, through the conical guard 1002 and into the vent line of the EVAP system. The conical guard 1002 may be attached to a vehicle so that the conical guard 1002 is oriented upside down relative to the orientation shown in FIGS. 10-11B, allowing the nearly stationary debris to fall out of the conical guard 1002 due to gravity.

A shape of the vortex formed by the flow of air may be affected by the tilt angle α of the louvers 1024. For example, by decreasing the tilt angle α, the gap 1104 between the second segment 1102 of the louvers 1024 and the solid section 1108 of the screen 902, as shown in FIG. 11B, may also decrease. Decreasing the tilt angle α may generate a stronger vortex, e.g. increase swirling of the air, but an associated decrease in the gap 1104 may also impose a restriction of air flow into the conical guard 1002. When the tilt angle α becomes smaller than 10 degrees, the gap 1104 may become prohibitively small and inhibit efficient purging of a fuel vapor canister.

As another example, increasing the tilt angle α may correspond to an increase in the gap 1104. The larger tilt angle α imparts less swirl to the air flow, forming a weaker vortex in the conical guard 1002 but allowing higher rates of air flow into the conical guard 1002. Increasing the tilt angle α to greater than 80 degrees may reduce rotation of the incoming air to an extent that the flow path becomes nearly linear through the conical guard 1002. The louvers 1024 may no longer assist in separating debris from the path of air flow into the vent line based on centrifugal force.

It will be appreciated that the louvers 1024 may be oriented in an opposite configuration with respect to the openings 904 of the screen 902 from an arrangement of the louvers 1024 shown in FIGS. 11A-11B, as described above for FIG. 11B. In the opposite orientation, the louvers 1024 may direct an opposite, clock-wise swirling of air within the conical guard 1002. The clock-wise vortex may produce similar effects on air and debris movement in and out of the conical guard 1002 as described above for FIGS. 11A-11B.

A conical guard configured to inhibit entry of mobile organisms and reduce an amount of debris entering a vent line of an EVAP system may be implemented with additional features to assist in trapping and expelling debris. For example, if air flow into the conical guard is sufficiently high, a portion of the entrained debris may retain enough momentum to travel through the conical guard, into the vent line, even when the conical guard is oriented upside down (e.g., with respect to FIGS. 10-11B). In addition to adapting the conical guard with louvers to generate helical air flow, the conical guard may include a shelf or baffle to block passage of debris into the vent line. Another example of a conical guard 1202 is shown in a cross-section 1200 of the conical guard 1202 in FIG. 12. The conical guard 1202 is depicted with a screen 1204 but without louvers, e.g. the louvers 1024 of FIGS. 9-11B, for simplicity, and also includes a baffle 1218 to retain debris within the conical guard 1202.

The cross-section 1200 shows a structure of the conical guard 1202 that includes a thin, with respect to the x-axis, curved wall 1206 forming a hollow and conical upper portion 1208 of the conical guard 1202. The screen 1204 is arranged across a top, with respect to the y-axis, of the conical guard 1202, entirely covering a top opening of the conical guard 1202. The upper portion 1208 is positioned above a lower portion 1210 of the conical guard 1202, the upper portion 1208 merging with the lower portion 1210 at a mid-point 1212 where a collar 1214, similar to the collar 424 of the conical guard 402 of FIGS. 4-6, is arranged. An overall shape of the conical guard 1202 is similar to the conical guard 402 of FIGS. 4-6, and the conical guard 1202 also has a central axis 1216 aligned with the y-axis. A diameter of the conical guard 1202, defined along the x-axis, is widest at the top of the conical guard 1202 and tapers downwards along the y-axis, becoming uniform through the lower portion 1210.

The conical guard 1202 may be adapted with the baffle 1218 coupled to an inner surface 1220 of the curved wall 1206 at an outer edge 1222 of the baffle 1218. The baffle 1218 may be centered about the central axis 1216 and configured as an annular disc that is not planar. Instead, the baffle may be angled so that an inner edge 1224, proximate to the central axis 1216, of the baffle 1218 is higher, relative to the y-axis, than the outer edge 1222. A plane of the baffle 1218 may be tilted relative to the central axis 1216 by an angle θ between 10-60 degrees. As the angle A increases, a width 1225 of the baffle 1218 may be decreased to maintain an area of air flow through a central opening of the baffle 1218. An increase in the angle θ may result in the baffle 1218 protruding further into a central flow path of air through the conical guard 1202, along the central axis 1216 and may restrict flow. Thus, reducing the width 1225 may offset any restriction on air flow imposed by the angling of the baffle 1218. A maximum allowable protrusion of the baffle 1218 may be a width of the baffle 1218 that a diameter, defined in a direction perpendicular to the central axis 1216, of the flow path along the central 1216 through the baffle 1218 is at least 20% greater than a diameter of the conical guard 1202 at the mid-point 1212.

The baffle 1218 may act as a retaining wall for airborne debris drawn into the conical guard 1202 and diverted towards the curved wall 1206 of the conical guard 1202 by centrifugal force. A flow of air is indicated by solid arrows 1226 and a path of air flow is depicted along the right-hand side of the conical guard 1202 and not the left-hand side for clarity. However, the path of air flow through the left-hand side of the conical guard 1202 may be mirror-symmetric about the central axis 1216. Similarly, a flow of debris is indicated by dashed arrows 1228 along the left-hand side of the conical guard 1202 for simplicity but may also be mirrored across the central axis on the right-hand side of the conical guard 1202.

Figure 12:
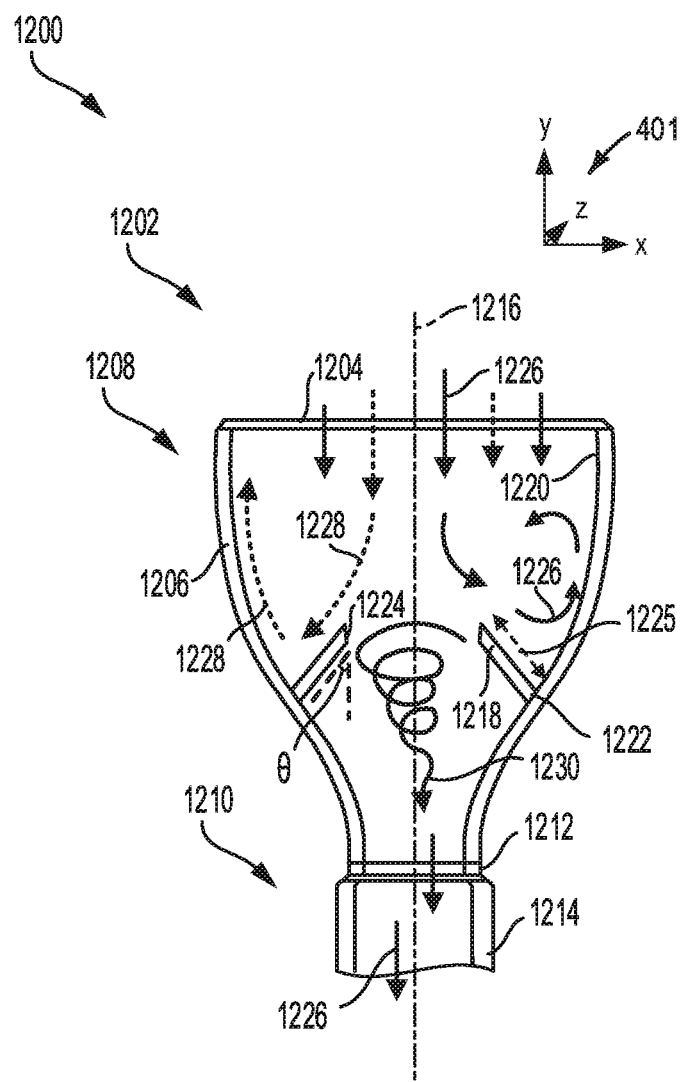
FIG. 12 shows a cross-sectional view of an example of the conical guard that is adapted to block mobile organisms and trap debris.

Air may enter the conical guard 1202 through the screen 1204 and curve away from the central axis 1216 due to contact with the louvers (not shown in FIG. 12), as shown by arrows 1226 on the right-hand side of the conical guard 1202 in FIG. 12. The flow of air may entrain debris, as shown by arrows 1228 on the left-hand side of the conical guard 1202, through the screen 1204. The path of debris flow may also curve away from the central axis 1216 and an inertia of the debris may cause the debris to decelerate relative to the air. As the debris slows while swirling along the curved wall 1206 inside an upper region of the upper portion 1208 of the conical guard 1202, further travel of the debris downwards along the y-axis may be impeded by the baffle 1218, effectively trapping the debris above the baffle 1218.

The presence of the baffle 1218 may also alter the path of air flow within the upper portion 1208 of the conical guard 1202. As the air spirals around and downwards along the central axis 1216 upon entering the conical guard 1202 through the screen 1204, the vortex generated by swirling air within the upper region of the upper portion 1208 of the conical guard 1002 may also create turbulence in boundary regions of the flow. More specifically, turbulent eddies may be formed by friction between the air and a solid surface such as when the moving air contacts inner surface of the conical guard 1202. In one example, a first portion of the flow may come into contact with an upper surface of the baffle 1218 and flow across the upper surface. As the first portion of the air flow travels across the upper surface of the baffle 1218, the air may be quickly deflected upwards by contact with the inner surface 1220 of the curved wall 1206 of the conical guard 1202. The first portion of the air may flow upwards along the curved wall 1206 and swirl towards the central axis 1216, becoming entrained with air flow drawn in through the screen 1204. A second portion of the air may continue spiraling downwards around the central axis 1216, gradually adopting a linear flow path through the lower portion 1210 of the conical guard 1202, as indicated by spiral arrow 1230.

As the first portion of air is deflected by both the baffle 1218 and the inner surface 1220 of the curved wall 1206, the deflection may cause the first portion of air to accelerate. The rapid increase in flow velocity of the first portion of air may exert a force on the nearly stationary debris, trapped above the baffle 1218, that pushes the debris upwards, along the y-axis, towards the screen 1204 and along the curved wall 1206, as indicated by arrows 1228. If the force from the accelerating air is sufficiently high, the debris may be ejected from the conical guard 1202 through the screen 1204 at ends of the openings of the screen 1204 proximate to the curved wall 1206.

The force exerted on the debris accumulated in the conical guard 1202 above the baffle 1218 may be affected by the rate of air flow into the EVAP system. When low flow rates are sufficient for fuel vapor canister purging, little force may be exerted on the debris and removal of the debris from the conical guard 1202 may rely on gravity to compel the debris to fall out of the conical guard 1202 (when the conical guard 1202 is positioned upside down). However, when flow rates into the conical guard 1202 are high, for example if high flow rates are demanded to purge the fuel vapor canister, such as in hybrid electric vehicle or start-stop applications, a likelihood is increased that the turbulent air flow generated along the inner surface 1220 of the curved wall 1206 towards the screen 1204 is high enough to drive movement of the debris trapped above the baffle 1218. The debris may be accelerated towards the screen 1204 along the y-axis and may or may not lose momentum before reaching the screen 1204.

For applications where the flow rates through a conical guard are high and arrangement of the conical guard in the upside down position is not desirable, the conical may be adapted with a particle outlet port. An example of a conical guard 1302 is shown in FIG. 13 from a perspective view 1300, comprising an upper portion 1304 and a lower portion 1306 with components similar to those shown for the conical guard 1202 of FIG. 12 and will not be re-introduced for brevity. The conical guard 1302 has a central axis 1301 and a particle outlet port 1308 disposed in a curved wall 1310 of the upper portion 1304.

The particle outlet port 1308 may be a tangential opening through the curved wall 1310, configured with a door 1312. The door 1312 may be opened when a first edge 1314 of the door 1312 is pivoted away from the curved wall 1310. The particle outlet port 1308 may directly couple air inside the conical guard 1302 to ambient air surrounding the conical guard 1302 when the door 1312 is open. In one example, the door 1312 may be pivoted about a hinge arranged along a second edge 1316 of the particle outlet port 1308 and the door 1312 may be adapted to swing open when moving debris exerts a force against the door 1312. In another example, the conical guard 1302 may be molded or cast with the door 1312 of the particle outlet port 1308 as a fixed flap attached to the curved wall 1310 of the conical guard 1302 in an open position. In addition, while the conical guard 1302 of FIG. 13 includes one particle outlet port 1308, other examples may include multiple particle outlet ports disposed in various locations along the curved wall 1310 of the conical guard 1302. The particle outlet ports may also differ in size and shape without altering a role of the particle outlet ports.

The particle outlet port 1308 may be positioned along the curved wall 1310 of the upper portion 1304 of the conical guard 1302 between a baffle 1318, positioned inside the conical guard 1302, and a screen 1320, disposed at a top of the conical guard 1302, with respect to the y-axis. The particle outlet port 1308 may be closer to the screen 1320 than the baffle 1318 but a location of the particle outlet port 1308 may be adjusted based on anticipated flow rates of air through the conical guard 1302. For example, for higher flow rates, it may be desirable to place the particle outlet port 1308 proximate to the screen 1320 as shown in FIG. 13 and for lower flow rates, the particle outlet port 1308 may be adjusted closer to the baffle 1318.

The particle outlet port 1308 may provide an opening through which debris trapped within the upper portion 1304 of the conical guard 1302 and carried upwards towards the screen 1320 by turbulent eddies may be ejected from the conical guard 1302. While the debris may not have sufficient momentum to travel along the y-axis to pass through the screen 1320, placement of the particle outlet port 1308 between the baffle 1318 and the screen 1320 provides a shortcut for the debris to exit the conical guard 1302 before losing momentum and becoming stationary. The debris may thereby be ejected from the conical guard 1302 without depending on gravity-induced motion, during high flow applications of the conical guard 1302.

Other variations may be included in a configuration of a conical guard to adjust a capacity of the conical guard to compel spiral air flow to form a vortex. For example, the conical guard may be adapted with different screen geometries. By modifying a shape of the screen openings, a performance of the conical guard may be adjusted according to an environment where the conical guard is to be used. As one example, the conical guard may be configured with a screen 1400 with curved openings 1402 shown in FIG. 14. The curved openings 1402 may all curve in a same direction so that each the curved openings are identical. The curved openings 1402 are separated by curved ribs 1404 and the curved ribs 1404 are secured in place by coupling at an inner end 1406 to a central hub 1401 and at an outer end 1408 to a rim 1410.

The curved openings 1402 of the screen 1400 may enhance swirling of air entering the conical guard, further enhanced by adapting the screen 1400 with louvers, such as the louvers 1024 of FIGS. 10-11B. The enhanced swirling of incoming air may increase separation of debris from the air flow. Thus configuring a conical guard with the screen 1400 of FIG. 14 may be desirable for use of the conical guard in environments with elevated concentrations of airborne particulate matter.

Increased separation of debris from the airstream may also be achieved by adapting the conical guard with the screen 700 of FIG. 7. The alternating pattern of longer and shorter openings (e.g. the first set of flow passages 704 and the second set of flow passages 720) increases a number of openings positioned around an outer periphery of the screen 700, thereby increasing swirling of air drawn into the conical guard. A greater coverage of the screen 700 by solid material impervious to flow as compared to the screen 1400 of FIG. 14 or the screen 902 of FIGS. 9-11A, however, may inflict higher restriction on flow through the screen 1400. The screen 1400 of FIG. 14 may therefore be suitable for environments with high levels of airborne particulate matter and low refueling flow rate demands.

An example of a method 1500 for an EVAP system, such as the EVAP system 251 of FIG. 2 and 303 of FIG. 3, of a vehicle is shown in FIG. 15. The EVAP system may be coupled to a fuel tank and include a fuel vapor canister configured to adsorb fuel vapors from gases flowing into the fuel vapor canister from the fuel tank, a fuel tank isolation valve (FTIV) positioned between the fuel tank and the fuel vapor canister, a purge valve arranged between the fuel vapor canister an engine intake manifold of the vehicle, various conduits connecting components of the EVAP system, a vent line, and a conical guard such as the conical guard 402 of FIGS. 4-6, the conical guard 1002 of FIGS. 10-11A, the conical guard 1202 of FIG. 12, and the conical guard 1302 of FIG. 13, arranged at an end of the vent line. The fuel vapor canister may be adapted with a temperature sensor, such as canister temperature sensor 232 of FIG. 2 and the fuel tank may have a fuel lever sensor installed, such as the fuel lever sensor 234 of FIG. 2. Instructions for carrying out at least a portion of method 1500 may be executed by a controller, e.g., controller 212 of FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 1502, the method includes refueling the vehicle. For example, a fuel level in the fuel tank, detected by the fuel level sensor, may be determined by a vehicle operator to be undesirably low or a fuel light on the vehicle dashboard may be activated, indicating the fuel tank is nearing empty.

Refueling the vehicle may include injecting fuel into the fuel tank at 1504 by a nozzle delivering fuel from a pump or other fuel source. The fuel tank isolation valve 1506 is opened at 1506 and the purge valve is closed or maintained closed. As fuel is delivered to the fuel tank and a fluid level in the fuel tank rises, a headspace volume in the fuel tank decreases. Fuel vapor is flowed from the fuel tank to the fuel vapor canister at 1508 as a pressure in the fuel tank rises. Fuel vapor molecules are adsorbed by a material in the fuel vapor canister and air is vented through the vent line at 1510.

As the air flows through the vent line, the air passes through the conical guard, positioned at a terminal end of the vent line. A screen of the conical guard, disposed at an end of the conical guard distal to the end of the vent line perpendicular to a direction of air flow, may include small openings that define flow passages through the screen. The conical guard acts as a diffuser and a pressure differential across the screen is decreased by an increase in diameter of the conical guard, from a mid-point along a length of the conical guard to the end of the conical guard distal to the end of the vent line. Air flows out of the conical guard through the screen to mix with ambient air.

At 1512 of the method, the fuel vapor canister is purged. As an example, purging of the fuel vapor canister may occur when the controller receives information from the canister temperature sensor indicating, based on a temperature of the canister surpassing a threshold temperature, that an adsorbent of the canister is saturated. As another example, the canister may be purged when an emissions control device, such as the emissions control device 270 of FIG. 2 reaches a light-off temperature and the engine is operated in a purge mode with the engine running.

Purging the fuel vapor canister may include opening the purge valve and closing the FTIV at 1514. Air is drawn into the fuel vapor canister due to exposure of the EVAP system to low pressure at the intake manifold, pulling air into the vent line through the conical guard at 1516. The conical guard acts as a nozzle, providing a constriction as the diameter of the conical guard decreases. The decrease in diameter enhances a flow velocity of the air as the air passes through the constriction, increasing a speed and volume of air delivered to the fuel vapor canister and offsetting a decrease in flow due to the small openings in the screen of the conical guard. The air flow entrains fuel vapors released from the adsorbent of the fuel vapor canister and the mixture of air and fuel vapor is delivered to the intake manifold for subsequent combustion at 1518.

The conical guard may be adapted with louvers, such as the louvers 1024 of FIG. 10-11B, coupled to openings of the screen and angled so that air entering the conical guard is rotated, forming a vortex. The rotation of the air assists in separating debris, such as dust, from the air due to centrifugal force which results in the debris coming into contact with an inner surface of the conical guard and losing velocity. The conical guard may also have an inner baffle, e.g., the baffle 1218 of FIG. 12 and 1318 of FIG. 13, that traps the debris within an upper region of the conical guard. In addition, the conical guard may have at least one particle outlet port, such as the particle outlet port 1308 of FIG. 13, providing an opening in an outer housing of the conical guard that allows debris, transported by turbulent air flow, to be ejected through the particle outlet port. The debris is thereby removed from the flow of air drawn into the EVAP system through the conical guard while inhibiting entry of mobile organisms and maintaining a rate of flow into the EVAP system suitable for purging the fuel vapor canister.

In this way, a guard for a vent line of an evaporative emissions control (EVAP) system may impede entry of objects and mobile organism into the vent line. The guard may render the vent line inaccessible to spiders that may otherwise spin webs or cocoons within the vent line and restrict flow through the vent line during refueling of a vehicle or purging of a fuel vapor canister. The guard may also be configured to trap debris within an upper region of the conical guard due generation of a vortex that separates the debris from the main air stream. The guard may include a conical portion with a screen comprising flow channels that are sufficiently small to block intrusive objects and organisms and adapted with louvers to compel swirling of incoming air. The conical shape may offset flow restriction resulting from a size of the flow channels of the guard by acting alternatively as a diffuser during refueling events and as a nozzle during fuel vapor canister purging events, respectively, thereby decreasing a pressure drop across the screen of the conical guard and increasing flow velocity into the EVAP system during purging. A flow velocity out of the conical guard during refueling is maintained constant regardless of refueling rate, reducing variation in flow constriction during venting of a fuel tank and reducing a probability of premature shut-off of an external refueling device. By adjusting a diameter ratio of a widest region to a narrowest region of the conical guard, a ratio of the diameter at the widest region to a length of the conical guard, as well as shapes of the conical guard screen and flow passages, dimensions of the conical guard may be readily modified to accommodate a geometry and arrangement of the EVAP system components and adjacent vehicle parts while maintaining a desired flow velocity and pressure differential. By adapting the conical guard with features such as the louvers, an inner baffle, and at least one particle outlet port, the conical guard may separate and remove debris from the flow path into the EVAP system more efficiently.

The technical effect of configuring the EVAP system of a vehicle with the conical guard is that refueling and fuel vapor canister purging efficiency is increased while inhibiting entry of particulate matter and organisms into the EVAP system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

In one embodiment, a guard for an air conduit includes an outer housing, a first portion of the outer housing having a conical shape and a second portion of the outer housing having a uniform diameter along a length of the guard, the length parallel with a direction of flow through the guard, and a screen disposed in the first portion of the outer housing, perpendicular to the length of the guard. In a first example of the guard, the first portion of the outer housing has a non-uniform diameter that is widest at an end distal to the second portion and tapers to a diameter equal to the diameter of the second portion at a mid-point where the first portion and second portion are coupled. A second example of the guard optionally includes the first example, and further includes wherein the screen is positioned at the end of the first portion of the outer housing distal to the second portion and entirely covers an opening at the end of the first portion of the outer housing. A third example of the guard optionally includes one or more of the first and second examples, and further includes, wherein the screen includes openings coupling air surrounding the guard to air inside the guard and the openings are separated by solid surfaces, the solid surfaces impervious to air flow. A fourth example of the guard optionally includes one or more of the first through third examples, and further includes, wherein a width of each of the openings of the screen is at most 1.5 mm. A fifth example of the guard optionally includes one or more of the first through fourth examples, and further includes, wherein the openings in the screen, the openings defining flow passages through the guard, are shaped as concentric annular openings relative to a central axis of the guard. A sixth example of the guard optionally includes one or more of the first through fifth examples, and further includes, wherein the openings in the screen radiate linearly from a central region of the screen. A seventh example of the guard optionally includes one or more of the first through sixth examples, and further includes, wherein the openings in the screen radiate from a central region of the screen and are curved relative to a central axis of the guard. An eighth example of the guard optionally includes one or more of the first through seventh examples, and further includes, wherein the openings in the screen include a first set of openings radiating linearly from a central region of the screen and a second set of openings radiating linearly from a mid-point between the central region and an outer periphery of the screen towards the outer periphery, the first set of openings and second set of openings arranged in an alternating pattern around a circumference of the screen. A ninth example of the guard optionally includes one or more of the first through eighth examples, and further includes, wherein the screen is domed and curves outwards, away from the second portion of the guard. A tenth example of the guard optionally includes one or more of the first through ninth examples, and further includes, wherein a louver is coupled to each of the openings, the louver attached along one edge of each of the openings and formed from a first segment extending from the edge of each of the openings towards an interior of the guard at an angle relative to a central axis of the guard and a second segment extending from the first segment in a direction parallel with a plane of the screen and spaced away from the screen. An eleventh example of the guard optionally includes one or more of the first through tenth examples, and further includes, wherein an annular baffle is positioned within an interior of the first portion of the guard between the screen and the mid-point of the guard, the baffle coupled along an outer edge to a wall of the first portion of the guard and extending towards the central axis of the guard at an angle relative to the central axis and wherein the baffle is angled so that an inner edge of the baffle is closer to the screen than an outer edge of the baffle. A twelfth example of the guard optionally includes one or more of the first through eleventh examples, and further includes, wherein at least one opening is disposed in the wall of the first portion of the guard between the screen and the baffle and proximate to the screen, the opening adapted with a flap coupled to a side of the opening along a first edge of the flap and pivoted so that a second edge of the flap is spaced away from the wall of the first portion of the guard.

In another embodiment, a method includes flowing air in a first direction through a vent line of the EVAP system in response to a pressure of a fuel tank of the EVAP system increasing, the EVAP system adapted with a conical guard fluidly coupled to the fuel tank by the vent line and a fuel vapor canister, the vent line arranged between the fuel vapor canister and the conical guard, and flowing air in a second direction through the vent line, opposite of the first direction, in response to exposure of the fuel vapor canister to vacuum, the fuel vapor canister fluidly coupled to the conical guard by the vent line. In a first example of the method, flowing air in the first direction includes guiding air through the conical guard along a direction corresponding to an increase in diameter of the conical guard wherein flowing air in the second direction includes guiding air through the conical guard along a direction corresponding to a decrease in diameter of the conical guard. A second example of the method optionally includes the first examples, and further includes wherein flowing air through the conical guard in the first direction decreases a pressure of the air in the conical guard and a pressure in the fuel tank as the air travels through the conical guard. A third example of the method optionally includes one or more of the first and second examples, and further includes, wherein flowing air through the conical guard in the second direction increases a velocity of the air flow from the conical guard into the fuel vapor canister and induces helical flow of air in the conical guard.

In another embodiment, an evaporative emissions control (EVAP) system includes a fuel tank, a fuel vapor canister fluidly coupled to the fuel tank, a vent line connected to the fuel vapor canister at a first end of the vent line, and a conically-shaped guard connected to a second end of the vent line at a first end of the conically-shaped guard and directly coupling gases in the EVAP system to ambient air, the conically-shaped guard including a screen adapted with a plurality of openings. In a first example of the system, the screen is disposed at a second end of the conically-shaped guard that is distal to the second end of the vent line, the screen arranged perpendicular to a direction of air flow and entirely covering an opening at the first end of the conically-shaped guard. A second example of the system optionally includes the first example, and further includes, wherein the conically-shaped guard is a diffuser when air is flowing through the conically-shaped guard in a direction from the first end to the second end of the conically-shaped guard and a nozzle when air is flowing in an opposite direction from the second end to the first end.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an evaporative emissions control (EVAP) system, comprising:
    flowing air in a first direction through a vent line of the EVAP system in response to a pressure of a fuel tank of the EVAP system increasing, the EVAP system adapted with a conical guard fluidly coupled to the fuel tank by the vent line and a fuel vapor canister, the vent line arranged between the fuel vapor canister and the conical guard; and
    flowing air in a second direction through the vent line, opposite of the first direction, in response to exposure of the fuel vapor canister to vacuum, the fuel vapor canister fluidly coupled to the conical guard by the vent line,
    wherein flowing air in the first direction includes guiding air through the conical guard along a direction corresponding to an increase in diameter of the conical guard, and wherein flowing air in the second direction includes guiding air through the conical guard along a direction corresponding to a decrease in diameter of the conical guard.

2. The method of claim 1, wherein flowing air through the conical guard in the first direction decreases a pressure of the air in the conical guard and a pressure in the fuel tank as the air travels through the conical guard.

3. The method of claim 1, wherein flowing air through the conical guard in the second direction increases a velocity of the air flow from the conical guard into the fuel vapor canister and induces helical flow of air in the conical guard.

4. The method of claim 1, wherein the air flowed in the first direction is flowed through a screen of the conical guard.

5. The method of claim 4, wherein the air passed through the screen of the conical guard mixes with ambient air.

6. The method of claim 1, wherein the air flowed in the second direction is part of a purge operation for the fuel vapor canister.

7. A method for an evaporative emissions control (EVAP) system, comprising:
    flowing air in a first direction through a vent line of the EVAP system in response to a pressure of a fuel tank of the EVAP system increasing, the EVAP system adapted with a conical guard fluidly coupled to the fuel tank by the vent line and a fuel vapor canister, the vent line arranged between the fuel vapor canister and the conical guard; and
    flowing air in a second direction through the vent line, opposite of the first direction, in response to exposure of the fuel vapor canister to vacuum, the fuel vapor canister fluidly coupled to the conical guard by the vent line,
    wherein flowing air through the conical guard in the second direction increases a velocity of the air flow from the conical guard into the fuel vapor canister and induces helical flow of air in the conical guard.

8. The method of claim 7, wherein the air flowed in the first direction flowed through a screen of the conical guard, the screen comprising angled louvers.

9. The method of claim 7, further comprising separating debris from the air via the helical flow and trapping the debris within the conical guard.

10. The method of claim 9, wherein the debris is trapped in an inner baffle of the conical guard.

* * * * *